(12) United States Patent  
Kobayashi et al.

(10) Patent No.: US 8,919,310 B2
(45) Date of Patent: Dec. 30, 2014

(54) VALVE OPEN/CLOSE TIMING CONTROL DEVICE

(71) Applicant: Aisin Seiki Kabushiki Kaisha, Kariya (JP)

(72) Inventors: Masaki Kobayashi, Okazaki (JP); Kazunari Adachi, Chiryu (JP); Kazuo Ueda, Gamagori (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/829,510

(22) Filed: Mar. 14, 2013

(65) Prior Publication Data

US 2014/0069360 A1 Mar. 13, 2014

(30) Foreign Application Priority Data

Sep. 11, 2012 (JP) ................. 2012-199695

(51) Int. Cl.
*F01L 1/34* (2006.01)
*F01L 1/344* (2006.01)

(52) U.S. Cl.
CPC .............. *F01L 1/34* (2013.01); *F01L 1/3442* (2013.01); *F01L 2001/34459* (2013.01); *F01L 2001/34463* (2013.01)
USPC ...................................... 123/90.17

(58) Field of Classification Search
USPC .......................... 123/90.15, 90.17
See application file for complete search history.

(56) References Cited

U.S. PATENT DOCUMENTS

| | | | | |
|---|---|---|---|---|
| 6,976,460 B2 * | 12/2005 | Komazawa et al. | ....... | 123/90.15 |
| 2010/0212615 A1 * | 8/2010 | Suzuki et al. | ............. | 123/90.17 |
| 2011/0023805 A1 * | 2/2011 | Takemura | .................. | 123/90.17 |
| 2011/0067657 A1 * | 3/2011 | Strauss | ....................... | 123/90.15 |
| 2012/0103289 A1 * | 5/2012 | Kato et al. | ................. | 123/90.15 |
| 2012/0152190 A1 | 6/2012 | Kobayashi et al. | | |

FOREIGN PATENT DOCUMENTS

JP  2011-0011888 A  1/2011

* cited by examiner

*Primary Examiner* — Thomas Denion
*Assistant Examiner* — Daniel Bernstein
(74) *Attorney, Agent, or Firm* — Buchanan Ingersoll & Rooney PC

(57) ABSTRACT

Provided is a valve open/close timing control device including, a drive-side rotating body, a driven-side rotating body, a fluid pressure chamber, a partition portion, a fluid control valve part, a first locking mechanism which is capable of restraining a relative rotational phase of the driven-side rotating body relative to the drive-side rotating body at a first predetermined phase between a most retarded angle phase and a most advanced angle phase, and a second locking mechanism which is capable of restraining the relative rotational phase at a second predetermined phase on a more retarded angle side than the first predetermined phase, in which the relative rotational phase is changed to the first predetermined phase when a shift lever position is changed to a parking range.

6 Claims, 14 Drawing Sheets

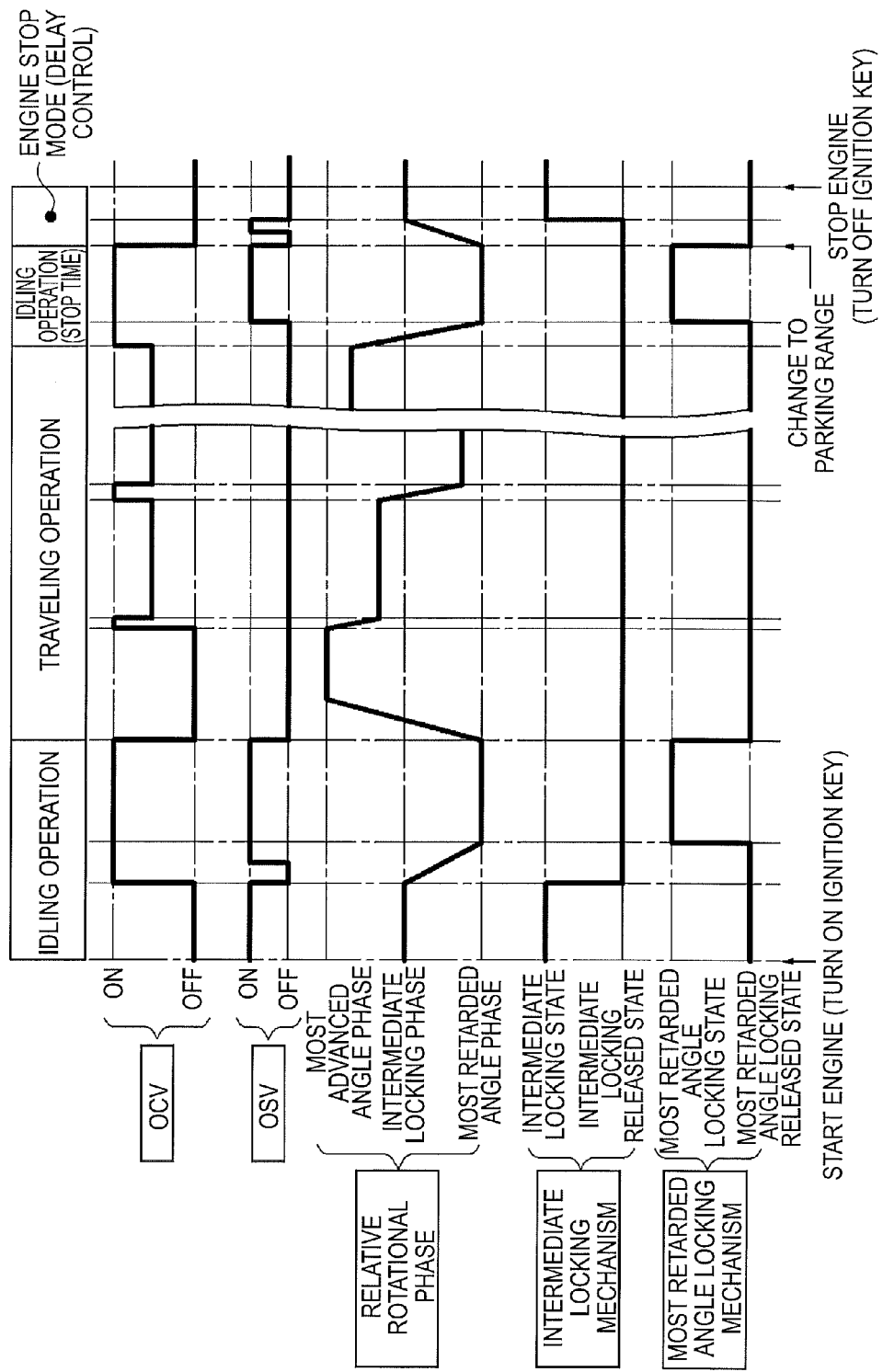

VALVE OPEN/CLOSE TIMING CONTROL DEVICE

CROSS REFERENCE TO RELATED APPLICATIONS

This application is based on and claims priority under 35 U.S.C. §119 to Japanese Patent Application 2012-199695, filed on Sep. 11, 2012, the entire content of which is incorporated herein by reference.

TECHNICAL FIELD

This disclosure relates to a valve open/close timing control device for controlling open/close timing of an intake valve and an exhaust valve of an internal combustion engine used in an automobile.

BACKGROUND DISCUSSION

Conventionally, JP 2011-1888 A (Reference 1) discloses a valve open/close timing control device which includes: a drive-side rotating body ("outer rotor" in Reference 1); a driven-side rotating body ("inner rotor" in Reference 1); a fluid pressure chamber which is partitioned into retarded angle chambers and advanced angle chambers by partition portions ("vanes" in Reference 1) which are formed by the drive-side rotating body and the driven-side rotating body, and are mounted on the driven-side rotating body; and a fluid control mechanism ("control valve" in Reference 1) which controls the supply of working fluid from a working fluid pump ("oil pump" or the like in Reference 1) which supplies working fluid to a fluid pressure chamber and the discharge of the working fluid from the fluid pressure chamber.

The valve open/close timing control device described in Reference 1 includes an intermediate phase fixing means which can fix a relative rotational phase of the driven-side rotating body with respect to the drive-side rotating body at a predetermined intermediate phase between a most retarded angle phase and a most advanced angle phase. The intermediate phase fixing means includes a locking key which is mounted on a drive-side rotating body side and a locking releasing hydraulic chamber formed in the driven-side rotating body, and the relative rotational phase is fixed at a predetermined intermediate phase due to the engagement of the locking key with the locking releasing hydraulic chamber.

Further, the valve open/close timing control device includes a stop-time phase change means which changes the relative rotational phase to the predetermined intermediate phase when a stop signal for stopping an internal combustion engine is detected. Accordingly, when the ignition is turned off, it is possible to stop the internal combustion engine after the relative rotational phase is fixed at the intermediate phase where the valve open/close timing is suitable for starting the internal combustion engine.

Due to such a constitution, the engine can be restarted in a state where the relative rotational phase is surely restrained to the predetermined phase. Accordingly, by setting the predetermined phase to a desired phase, the relationship between intake timing and ignition timing can be optimized so that startability of the engine can be enhanced. For example, it is possible to acquire a low-emission-type engine which emits a small amount of harmful combustion waste such as hydrogen carbide (HC).

Aiming at the enhancement of fuel economy, recently, the development of high compression in an engine has been in progress. In such an engine, a compression ratio becomes high when close timing of an intake valve is near a bottom dead center. Accordingly, there may be a case where the pre-ignition that the self-ignition of a mixture gas occurs before the ignition by an ignition plug arises under a condition that an intake air temperature is high. When the pre-ignition arises, a temperature of a cylinder wall is sharply elevated so that the lowering of an output or the malfunction of engine rotation is brought about. This may lead to the breaking of the engine. In such a case, the occurrence of the pre-ignition can be suppressed by lowering an actual compression ratio by changing closing timing to a retarded angle side using a variable valve timing mechanism. Accordingly, at the time of warm-starting the high compression engine, it is suitable to use a locking phase close to a most retarded angle side as the relative rotational phase of the valve open/close timing control device.

On the other hand, the engine is usually started using a starter (cell motor) in cold start, and a rotational speed of cranking in cold start is lower than a rotational speed of cranking in warm start and hence, in-cylinder pressure is hardly elevated. Accordingly, in cold start, an intermediate locking phase where the in-cylinder pressure is easily elevated is suitable as a relative rotational phase.

Further, the engine acquires an output by compressing air and fuel in the form of an air-fuel mixture and by igniting the air-fuel mixture. In an engine which repeatedly performs start and stop of the engine such as a hybrid engine or an engine which has an idling stop function, the vibrations of the engine in start can be suppressed by suppressing the compression of air. Accordingly, in restart of a hybrid engine in a warm state or in restart of the engine after an idling stop, a locking phase near a most retarded angle is suitable as a relative rotational phase.

In this manner, recently, along with popularization of hybrid engines and engines having an idling stop function, the number of phases suitable for starting an internal combustion engine is not limited to one phase. Further, also in an internal combustion engine having the constitution where a relative rotational phase is fixed at an intermediate phase and then the internal combustion engine is stopped when an ignition key is turned off, immediately after the ignition key is turned off, the supply of oil pressure is continued so as to change the relative rotational phase to the intermediate phase. Accordingly, the internal combustion engine is continuously operated for some time thus giving rise to a drawback from a viewpoint of fuel economy. Further, the fact that the internal combustion engine is continuously operated even after the ignition key is turned off gives a discomfort to a driver.

A need thus exists for a valve open/close timing control device which is not susceptible to the drawback mentioned above.

SUMMARY

In order to solve the above-described problem, according to an aspect of this disclosure, there is provided a valve open/close timing control device including:

a drive-side rotating body which is rotatable synchronously with a crankshaft of an internal combustion engine;

a driven-side rotating body which is arranged coaxially with the drive-side rotating body and in a rotatable manner relative to the drive-side rotating body, and is integrally rotatable with the camshaft for opening or closing a valve of the internal combustion engine;

a fluid pressure chamber which is formed on either one of the drive-side rotating body and the driven-side rotating body;

a partition portion mounted on the other of the drive-side rotating body and the driven-side rotating body so as to partition the fluid pressure chamber into an advanced angle chamber and a retarded angle chamber;

a fluid control valve part which controls the supply and the discharge of a fluid to and from the advanced angle chamber or the retarded angle chamber;

a first locking mechanism which is capable of restraining a relative rotational phase of the driven-side rotating body relative to the drive-side rotating body at a first predetermined phase between a most retarded angle phase and a most advanced angle phase; and a second locking mechanism which is capable of restraining the relative rotational phase at a second predetermined phase on a more retarded angle side than the first predetermined phase, in which the relative rotational phase is changed to the first predetermined phase when a shift lever position is changed to a parking range.

BRIEF DESCRIPTION OF THE DRAWINGS

The foregoing and additional features and characteristics of this disclosure will become more apparent from the following detailed description considered with the reference to the accompanying drawing, wherein:

FIG. 14 is a timing chart showing the manner of operation of the valve open/close timing control device of the second another embodiment.

DETAILED DESCRIPTION

An embodiment disclosed here will be a valve open/close timing control device on an intake valve side of an engine for an automobile and will is explained with reference to the attached FIG. 1 to FIG. 7. That is, the engine for an automobile corresponds to "internal combustion engine" according to this disclosure.

[Overall Constitution]

Figure 1:
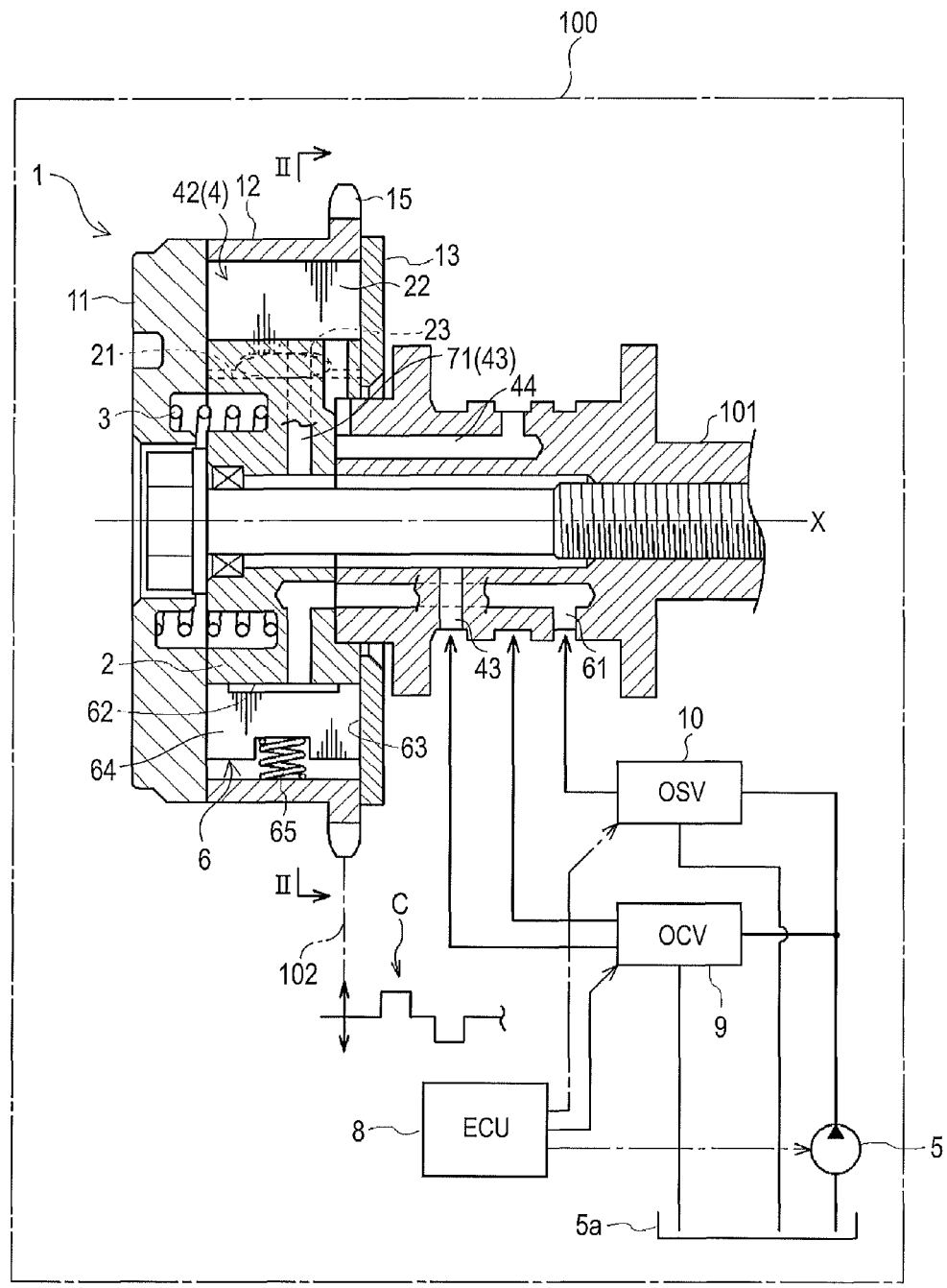
FIG. 1 is a view showing the overall constitution of a valve open/close timing control device according to embodiments disclosed here.

The valve open/close timing control device includes, as shown in FIG. 1, a housing 1 which constitutes a "drive-side rotating body" and is rotated synchronously with a crankshaft C of an engine 100, and an inner rotor 2 which constitutes a "driven-side rotating body" and is arranged coaxially with the housing 1 and in a rotatable manner relative to the housing 1 and is rotatable simultaneously with a camshaft 101. The camshaft 101 is a rotary shaft of a cam not shown in the drawing used for controlling opening/closing of an intake valve of the engine 100. The camshaft 101 is rotatably assembled to a cylinder head of the engine 100.

The valve open/close timing control device includes an intermediate locking mechanism 6 which constitutes a "first locking mechanism" capable of restraining a relative rotational phase of the inner rotor 2 relative to the housing 1 to a first predetermined phase between a most retarded angle phase and a most advanced angle phase by restraining the relative rotational movement of the inner rotor 2 relative to the housing 1. The valve open/close timing control device also includes a most retarded angle locking mechanism 7 which constitutes a "second locking mechanism" capable of restraining the relative rotational phase to a second predetermined phase which is on a more retarded angle side than the first predetermined phase.

[Inner Rotor and Housing]

The inner rotor 2 is, as shown in FIG. 1, integrally assembled to a distal end portion of the camshaft 101. The inner rotor 2 is fastened and fixed to the distal end portion of the camshaft 101 by a bolt.

The housing 1 includes a front plate 11 which is arranged on a side opposite to a side where the camshaft 101 is connected, an outer rotor 12 on which a timing sprocket 15 is integrally formed, and a rear plate 13 which is arranged on a side where the camshaft 101 is connected. The outer rotor 12 is exteriorly mounted on the inner rotor 2, the outer rotor 12 is sandwiched between the front plate 11 and the rear plate 13, and the front plate 11, the outer rotor 12 and the rear plate 13 are fastened together by bolts.

Figure 2:
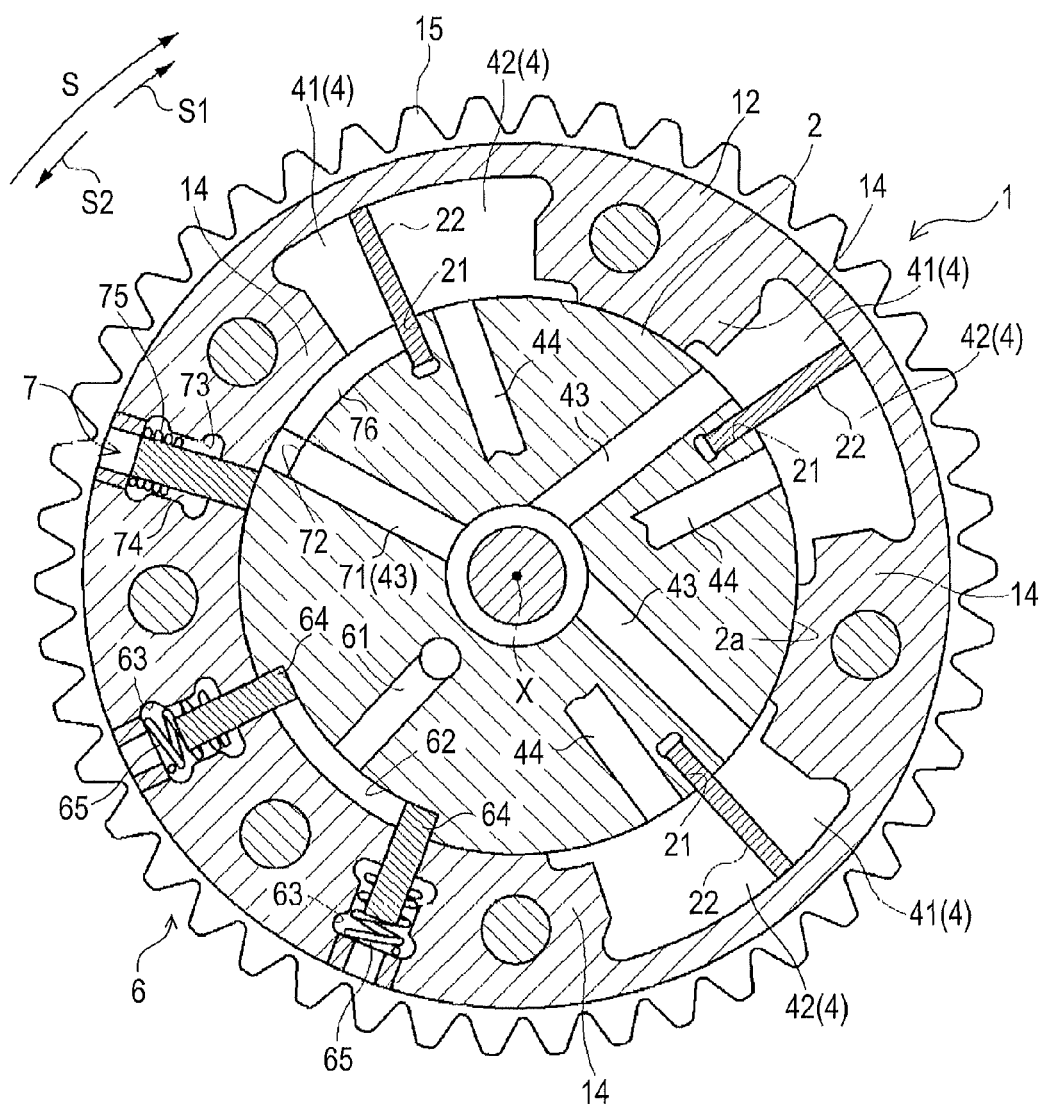
FIG. 2 is a cross-sectional view taken along a line II-II in FIG. 1, and also is a cross-sectional view of the valve open/close timing control device in an intermediate locking state.

The rotational driving of the crankshaft C is transmitted to the timing sprocket 15 by way of a power transmission member 102 so that the housing 1 is rotatably driven in the rotational direction S shown in FIG. 2. Along with the rotation of the housing 1, the inner rotor 2 is rotated in the rotational direction S so that the camshaft 101 is rotated. A cam mounted on the camshaft 101 pushes down an intake valve of the engine 100 so as to open the intake valve.

As shown in FIG. 2, a plurality of projecting portions 14 which project in the radially inward direction are formed on the outer rotor 12 in a spaced-apart manner from each other along the rotational direction S, and a fluid pressure chamber 4 is formed between the outer rotor 12 and the inner rotor 2. The projecting portions 14 function as shoes with respect to an outer peripheral surface 2a of the inner rotor 2. In this embodiment, the fluid pressure chamber 4 is formed at three places. However, the fluid pressure chamber 4 is not limited to such a constitution.

A vane groove 21 is formed on a portion of the outer peripheral surface 2a which faces the fluid pressure chamber 4. A vane 22 which constitutes a "partitioning portion" is arranged in the inside of the vane groove 21 in a radially outwardly extending manner. The fluid pressure chamber 4 is partitioned into an advanced angle chamber 41 and a retarded angle chamber 42 along the rotational direction S by the vane 22. By arranging a spring 23 between the vane groove 21 and the vane 22 thus biasing the vane 22 in a radially outward direction, a leakage of working fluid between the advanced angle chamber 41 and the retarded angle chamber 42 is prevented.

As shown in FIG. 1 and FIG. 2, advanced angle passages 43 are formed in the inner rotor 2 and the camshaft 101 in such a manner that the advanced angle passage 43 is communicated with each advanced angle chamber 41. Further, retarded angle passages 44 are formed in the inner rotor 2 and the camshaft 101 in such a manner that the retarded angle passage 44 is communicated with each retarded angle chamber 42. As shown in FIG. 1, the advanced angle passages 43 and the retarded angle passages 44 are connected to a predetermined port (not shown in the drawing) of an OCV 9 which constitutes a fluid control mechanism described later.

Working fluid is supplied to or discharged from the advanced angle chambers 41 and the retarded angle chambers 42 or a supply/discharge amount of working fluid is held by controlling the OCV 9 thus applying a fluid pressure of the working fluid to the vanes 22. In this manner, a relative rotational phase is displaced in the advanced angle direction or in the retarded angle direction or is held at an arbitrary phase. The advanced angle direction is the direction that the vane 22 rotatably moves relative to the housing 1 so that a volume of the advanced angle chamber 41 is increased, and is indicated by an arrow S1 in FIG. 2. The retarded angle direction is the direction that a volume of the retarded angle chamber 42 is increased, and is indicated by an arrow S2 in FIG. 2.

Due to such a constitution, the inner rotor 2 is smoothly rotatably movable relative to the housing 1 within a fixed range about a rotary axis X. The fixed range in which the housing 1 and the inner rotor 2 are rotatably movable relative to each other, that is, the phase difference between the most advanced angle phase and the most retarded angle phase corresponds to a range where the vane 22 is displaceable in the inside of the fluid pressure chamber 4. The most retarded angle phase is a phase at which the volume of the retarded angle chamber 42 becomes the largest, and the most advanced angle phase is the phase at which the volume of the advanced angle chamber 41 becomes the largest.

[Intermediate Locking Mechanism]

The intermediate locking mechanism 6 is provided for restraining the relative rotational phase to the intermediate locking phase which is the "first predetermined phase" between the most retarded angle phase and the most advanced angle phase by holding the housing 1 and the inner rotor 2 at predetermined relative positions in a state where a fluid pressure of working fluid is not stable immediately after starting the engine 100 or at the time of stopping the engine 100. Due to the provision of the intermediate locking mechanism 6, the rotational phase of the camshaft 101 relative to the rotational phase of the crankshaft can be properly maintained thus realizing the stable rotation of the engine 100. In this embodiment, the intermediate locking phase is set at the phase where valve opening timings of an intake valve and an exhaust valve (not shown in the drawing) partially overlap with each other. As a result, hydrogen carbide (HC) produced at the time of starting the engine 100 can be reduced thus providing the low-emission engine.

The intermediate locking mechanism 6 includes, as shown in FIG. 1 and FIG. 2, an intermediate lock passage 61, an intermediate locking groove 62, accommodating portions 63, plate-shaped intermediate locking members 64 and springs 65.

The intermediate lock passage 61 is formed in the inner rotor 2 and the camshaft 101, and connects the intermediate locking groove 62 and an OSV 10 which is a "fluid switching mechanism" described later to each other. By controlling the OSV 10, the supply and the discharge of working fluid to and from the intermediate locking groove 62 can be switched using only the OSV 10. The intermediate locking groove 62 is formed on the outer peripheral surface 2a of the inner rotor 2, and has a fixed width in the relative rotational direction. The accommodating portion 63 is formed in the outer rotor 12 at two places. Two intermediate locking members 64 are arranged in the respective accommodating portions 63 respectively, and are extendable from or retractable into the accommodating portions 63 in the radial direction. The spring 65 is arranged in the accommodating portion 63, and biases each intermediate locking member 64 radially inwardly, that is, toward the intermediate locking groove 62 side.

Figure 3:
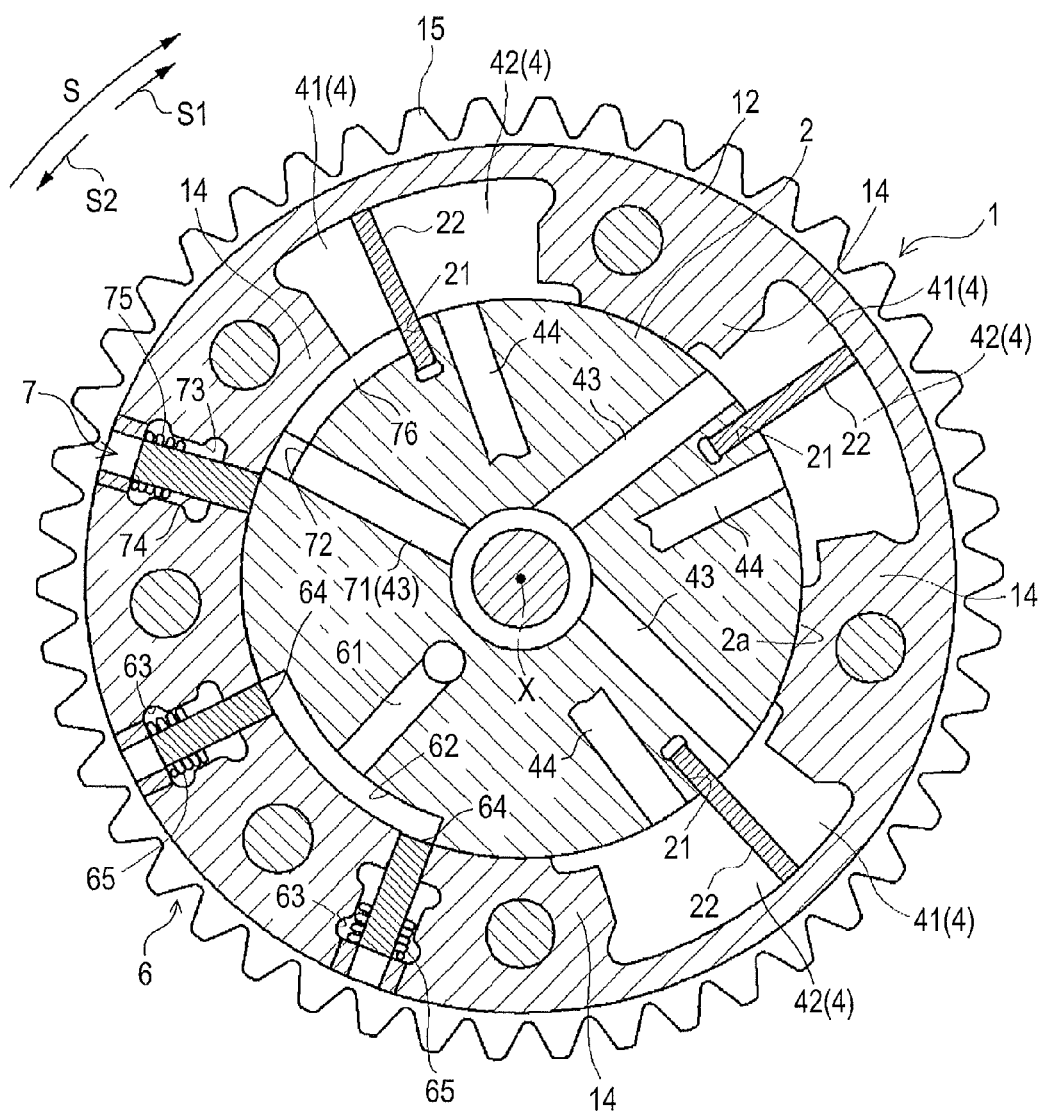
FIG. 3 is a cross-sectional view of the valve open/close timing control device when the intermediate locking state shown in FIG. 2 is released.

When working fluid is discharged from the intermediate locking groove 62, each intermediate locking member 64 projects into the intermediate locking groove 62. As shown in FIG. 2, when both intermediate locking members 64 project into the intermediate locking groove 62, the respective intermediate locking members 64 are respectively simultaneously engaged with both ends of the intermediate locking groove 62 in the circumferential direction. As a result, the relative rotational movement of the inner rotor 2 with respect to the housing 1 is restrained so that the relative rotational phase is restrained to the intermediate locking phase. When working fluid is supplied to the intermediate locking groove 62 by controlling the OSV 10, as shown in FIG. 3, both intermediate locking members 64 are retracted into the accommodating portions 63 from the intermediate locking groove 62 so that the restraint of the relative rotational phase is released whereby the inner rotor 2 becomes rotatably movable relative to the housing 1. Hereinafter, the state where the intermediate locking mechanism 6 restrains the relative rotational phase to the intermediate locking phase is referred to as the "intermediate locking state". On the other hand, the state where the intermediate locking state is released is referred to as the "intermediate locking released state".

With respect to a shape of the intermediate locking member 64, a pin shape or the like is suitably adopted besides a plate shape described in this embodiment.

[Most Retarded Angle Locking Mechanism]

The most retarded angle locking mechanism 7 is provided for restraining the relative rotational phase to the most retarded angle phase which is the "second predetermined phase" by holding the housing 1 and the inner rotor 2 at predetermined relative positions at the time of low speed rotation such as at the time of idling operation, at the time of idling stop, at the time of restarting idling or the like. That is, irrelevant to a displacement force in the retarded angle direction or the advanced angle direction based on a change in torque of the camshaft, the relative rotational movement of the inner rotor 2 is prevented and hence, a stable idling operation state can be realized. In this embodiment, the most retarded angle phase is the phase where valve closing timing of the exhaust valve and valve opening timing of the intake valve become substantially equal, and is the phase where an idling operation state becomes stable. The engine 100 can be started even when the relative rotational phase is at the most retarded angle phase.

Figure 6:
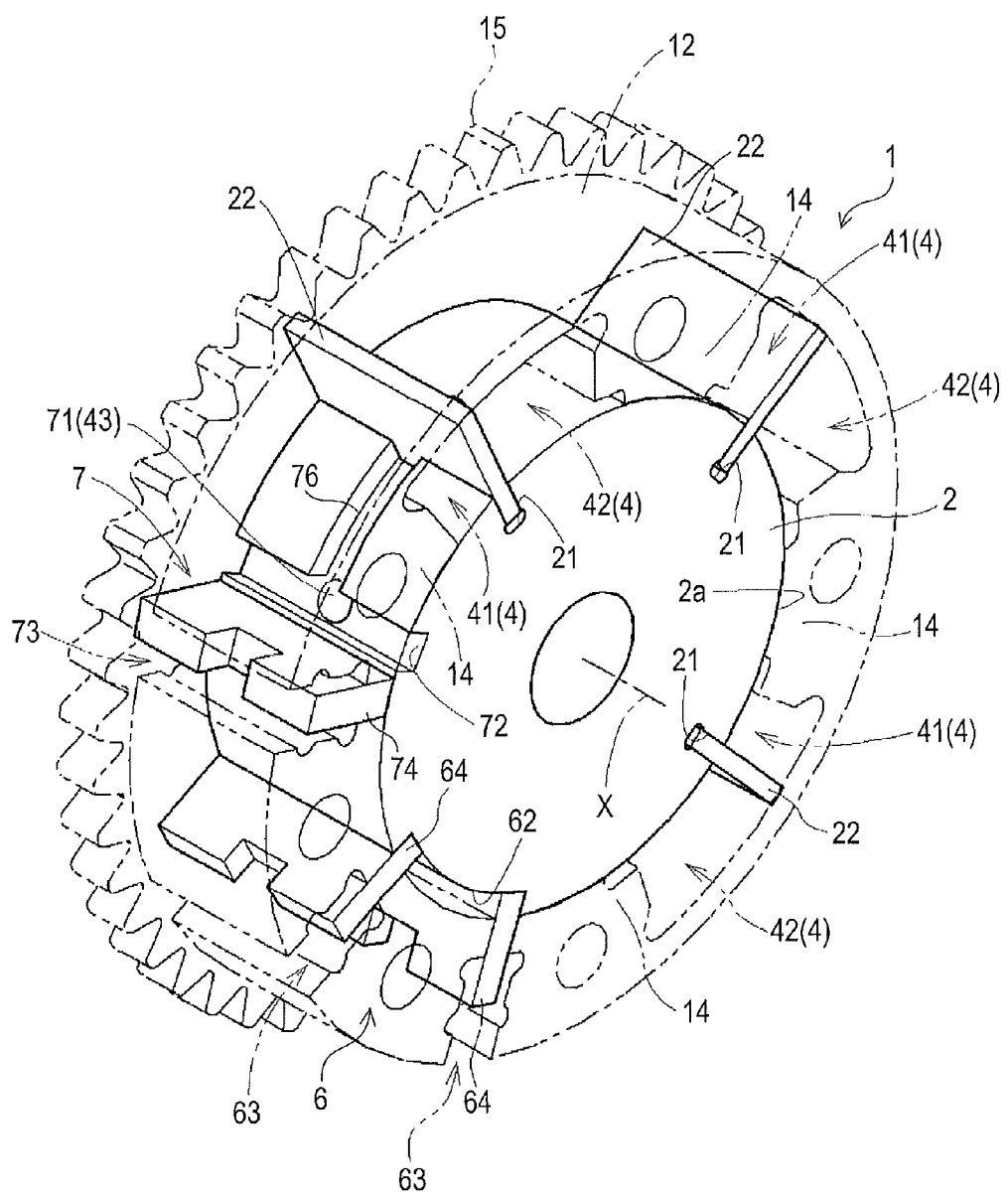
FIG. 6 is an exploded perspective view of the valve open/close timing control device.

The most retarded angle locking mechanism 7 includes, as shown in FIG. 1, FIG. 2 and FIG. 6, a most retarded angle lock passage 71, a most retarded angle locking groove 72, an accommodating portion 73, a plate-shaped most retarded angle locking member 74 and a spring 75.

The most retarded angle lock passage 71 also functions as one of the above-mentioned advanced angle passages 43, and connects the most retarded angle locking groove 72 and the OCV 9 to each other. Further, on the outer peripheral surface 2a of the inner rotor 2, an advanced angle chamber communication passage 76 which is a groove extending between the most retarded angle locking groove 72 and one of the vane grooves 21 in the circumferential direction is formed. When working fluid is supplied to or discharged from the advanced angle chamber 41 by the OSV 10, the working fluid is also supplied to or discharged from the most retarded angle locking groove 72. The accommodating portion 73 is formed in the outer rotor 12. The most retarded angle locking member 74 is arranged in the accommodating portion 73, and is extendable from or retractable into the accommodating portion 73 in the radial direction. The spring 75 is arranged in the accommodating portion 73, and biases the most retarded angle locking member 74 radially inwardly, that is, toward a most retarded angle locking groove 72 side.

Figure 4:
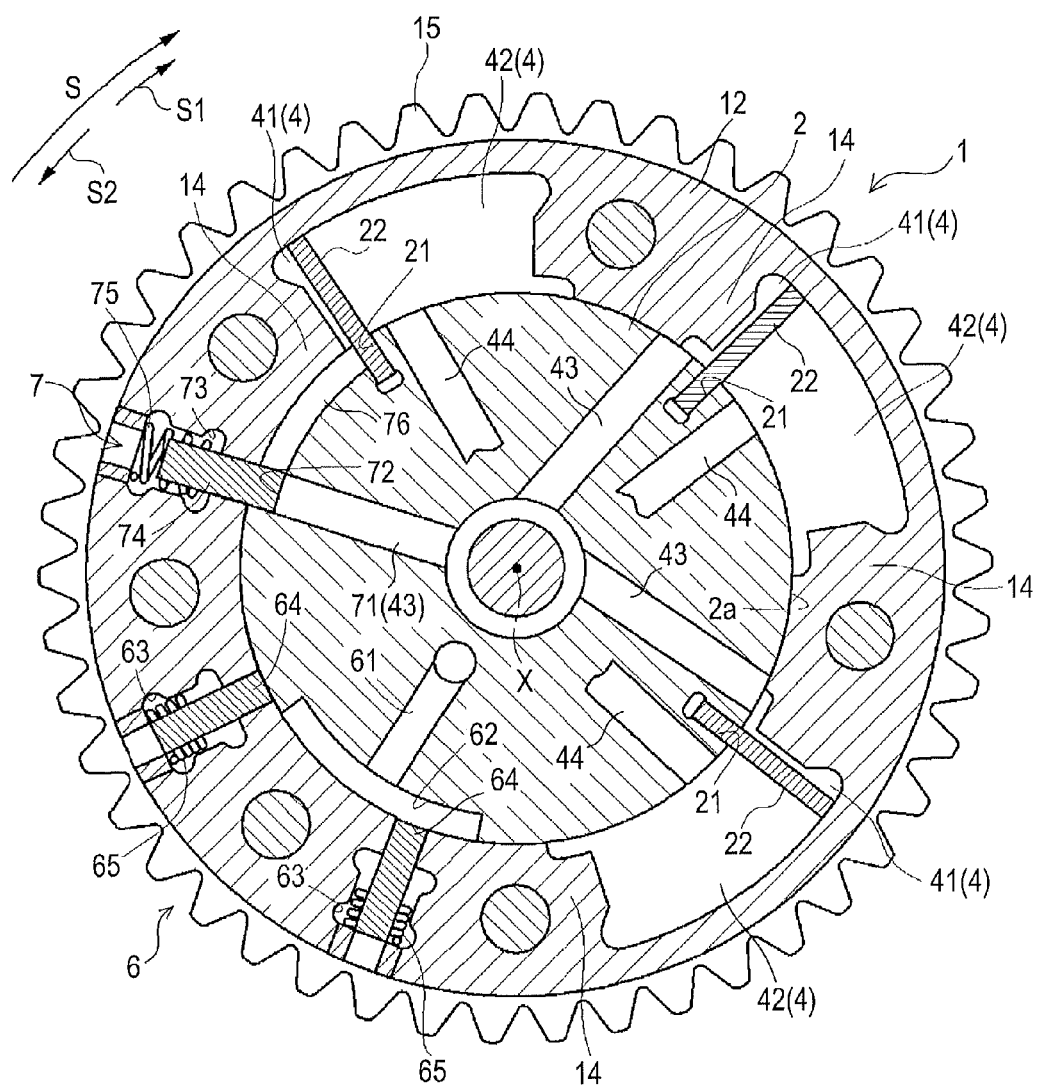
FIG. 4 is a cross-sectional view of the valve open/close timing control device when a relative rotational phase is at a most retarded angle phase.

When working fluid is discharged from the most retarded angle locking groove 72, the most retarded angle locking member 74 projects into the most retarded angle locking groove 72. As shown in FIG. 4, when the most retarded angle locking member 74 projects into the most retarded angle locking groove 72, the most retarded angle locking member 74 is engaged with the most retarded angle locking groove 72 so that the relative rotational movement of the inner rotor 2 with respect to the housing 1 is restrained whereby the relative rotational phase is restrained to the most retarded angle phase. When the relative rotational phase is displaced toward the advanced angle side by controlling the OCV 9, the working fluid is supplied to the most retarded angle locking groove 72 and hence, the most retarded angle locking member 74 is retracted into the accommodating portion 73 from the most retarded angle locking groove 72. That is, the restraint of the relative rotational phase is released. Hereinafter, the state where the most retarded angle locking mechanism 7 restrains the relative rotational phase to the most retarded angle phase is referred to as the "most retarded angle locking state". On the other hand, the state where the most retarded angle locking state is released is referred to as the "most retarded angle locking released state".

When the relative rotational phase is at the phase, other than the most retarded angle phase, the most retarded angle locking member 74 is positionally displaced from the most retarded angle locking groove 72 and hence, the most retarded angle locking member 74 is merely brought into slide contact with the outer peripheral surface 2a of the inner rotor 2. When the relative rotational phase is at these phases, that is, when the most retarded angle locking member 74 is retracted from the most retarded angle locking groove 72, the most retarded angle lock passage 71 and the advanced angle chamber 41 are always communicated with each other through the advanced angle chamber communication passage 76.

With respect to the shape of the most retarded angle locking member 74, a pin shape or the like can be suitably adopted besides a plate shape described in this embodiment. Further, the advanced angle chamber communication passage 76 may not be formed into a groove shape, and may be formed into a shape where an outer peripheral corner portion of the inner rotor 2 is chamfered although not shown in the drawing.

[Oil Pump]

An oil pump 5 serving as the "working fluid pump" is driven by the engine 100 and supplies working oil which is one example of "working fluid". The oil pump 5 is a mechanical hydraulic pump which is driven with the transmission of a rotational drive force of the crankshaft. The oil pump 5, as shown in FIG. 1, sucks working oil in an oil pan 5a, and discharges the working oil toward a downstream side. The discharged working oil is supplied to the fluid pressure chamber 4 by way of a fluid control mechanism and a fluid switching mechanism described later. Further, the working oil discharged from the fluid pressure chamber 4 is returned to the oil pan 5a by way of the fluid control mechanism and the fluid switching mechanism. Working fluid leaked from the valve open/close timing control device is also recovered to the oil pan 5a.

[OCV·OSV]

As shown in FIG. 1 and FIG. 2, the valve open/close timing control device includes the electromagnetic control type OCV (oil control valve) 9 which is the "fluid control mechanism" and the electromagnetic control type OSV (oil switching valve) 10 which is the "fluid switching mechanism". The OCV 9 and the OSV 10 are connected to the oil pump 5 respectively. With the use of the OCV 9, the supply and the discharge of working oil to and from the advanced angle passages 43, the most retarded angle lock passage 71 and the retarded angle passages 44, and the holding of a supply amount can be controlled. By controlling the OSV 10, the supply and the discharge of working oil to and from the intermediate lock passage 61 can be switched.

The OCV 9 has the spool type constitution, and is operated based on a control of an electricity supply amount performed by an ECU 8 (engine control unit). With the use of the OCV 9, the supply of working oil to the advanced angle chamber 41, the discharge of working oil from the retarded angle chamber 42, the discharge of working oil from the advanced angle chamber 41, the supply of working oil to the retarded angle chamber 42, the interruption of the supply and the discharge of working oil to and from the advanced angle chamber 41 and the retarded angle chamber 42 can be controlled. The control which is performed for supplying working oil to the advanced angle chamber 41 and the control for discharging working oil from the retarded angle chamber 42 constitute the "advanced angle control". When the advanced angle control is performed, the vanes 22 are rotatably moved in the advanced angle direction S1 relative to the outer rotor 12 and hence, the relative rotational phase is displaced toward the advanced angle side. The control which is performed for discharging working oil from the advanced angle chamber 41 and the control for supplying working oil to the retarded angle chamber 42 constitute the "retarded angle control". When the retarded angle control is performed, the vanes 22 are rotatably moved in the retarded angle direction S2 relative to the outer rotor 12 and hence, the relative rotational phase is displaced toward the retarded angle side. When the control is performed for interrupting the supply and the discharge of working oil to and from the advanced angle chamber 41 and the retarded angle chamber 42, the relative rotational movement of the vanes 22 is prevented and hence, the relative rotational phase can be held at an arbitrary phase.

When the advanced angle control is performed, working oil is supplied to the advanced angle passage 43 and the most retarded angle lock passage 71. In the most retarded angle locking state, as shown in FIG. 4, the most retarded angle lock passage 71 is closed by the locking member 74. When the locking member 74 is retracted from the most retarded angle locking groove 72 by the advanced angle control so that the most retarded angle locking released state is established, the most retarded angle lock passage 71 is released. Accordingly, working oil is also supplied to the advanced angle chamber 41 adjacent to which the most retarded angle locking mechanism 71 is arranged through the advanced angle chamber communication passage 76 and hence, the inner rotor 2 is rotatably moved toward an advanced angle side relative to the housing 1.

In this embodiment, the control of the valve open/close timing control device is set such that the retarded angle control enabling state is established when electricity is supplied to the OCV 9 (turning on the OCV 9), and the advanced angle control enabling state is established when the supply of the electricity to the OCV 9 is stopped (turning off the OCV 9). Further, opening of the OCV 9 is set by adjusting a duty ratio of electricity supplied to an electromagnetic solenoid. Accordingly, a supply amount/discharge amount of working oil can be finely adjusted.

The OSV 10 has a spool type constitution, and is operated based on switching between the supply of electricity to the ECU 8 and the stopping of the supply of electricity to the ECU 8. With the use of the OSV 10, the supply of working oil to the intermediate locking groove 62 and the discharge of the working oil from the intermediate locking groove 62 can be switched. In this embodiment, the OSV 10 is brought into a state where working oil can be discharged from the intermediate locking groove 62 when electricity is supplied to the OSV 10 (turning on the OSV 10), and the OSV 10 is brought into a state where working oil can be supplied to the intermediate locking groove 62 when the supply of electricity is stopped (turning off the OSV 10).

[Other Constitutions]

Although not shown in the drawing, a crank angle sensor which detects a rotational angle of the crankshaft C of the engine 100, and a camshaft angle sensor which detects a rotational angle of the camshaft 101 are provided to the valve open/close timing control device. The ECU 8 detects the relative rotational phase based on detection results from the crank angle sensor and the camshaft angle sensor, and determines the phase which the relative rotational phase assumes. Further, in the ECU 8, a signal system for acquiring ON/OFF information on the ignition key, information from an oil temperature sensor which detects an oil temperature of working oil and the like is formed. In a memory of the ECU 8, control information on an optimum relative rotational phase corresponding to the operation state of the engine 100 is stored. The ECU 8 controls the relative rotational phase based on information on an operation state (engine rotational speed, cooling water temperature or the like) and the above-mentioned control information.

As shown in FIG. 1, a torsion spring 3 is provided in an extending manner between the inner rotor 2 and the front plate 11. The torsion spring 3 biases the inner rotor 2 toward an advanced angle side such that the torsion spring 3 resists an average displacement force of the camshaft in the retarded angle direction based on a change in torque. Accordingly, the relative rotational phase can be smoothly and readily displaced in the advanced angle direction.

[Manner of Operation of Valve Open/Close Timing Control Device]

Figure 7:
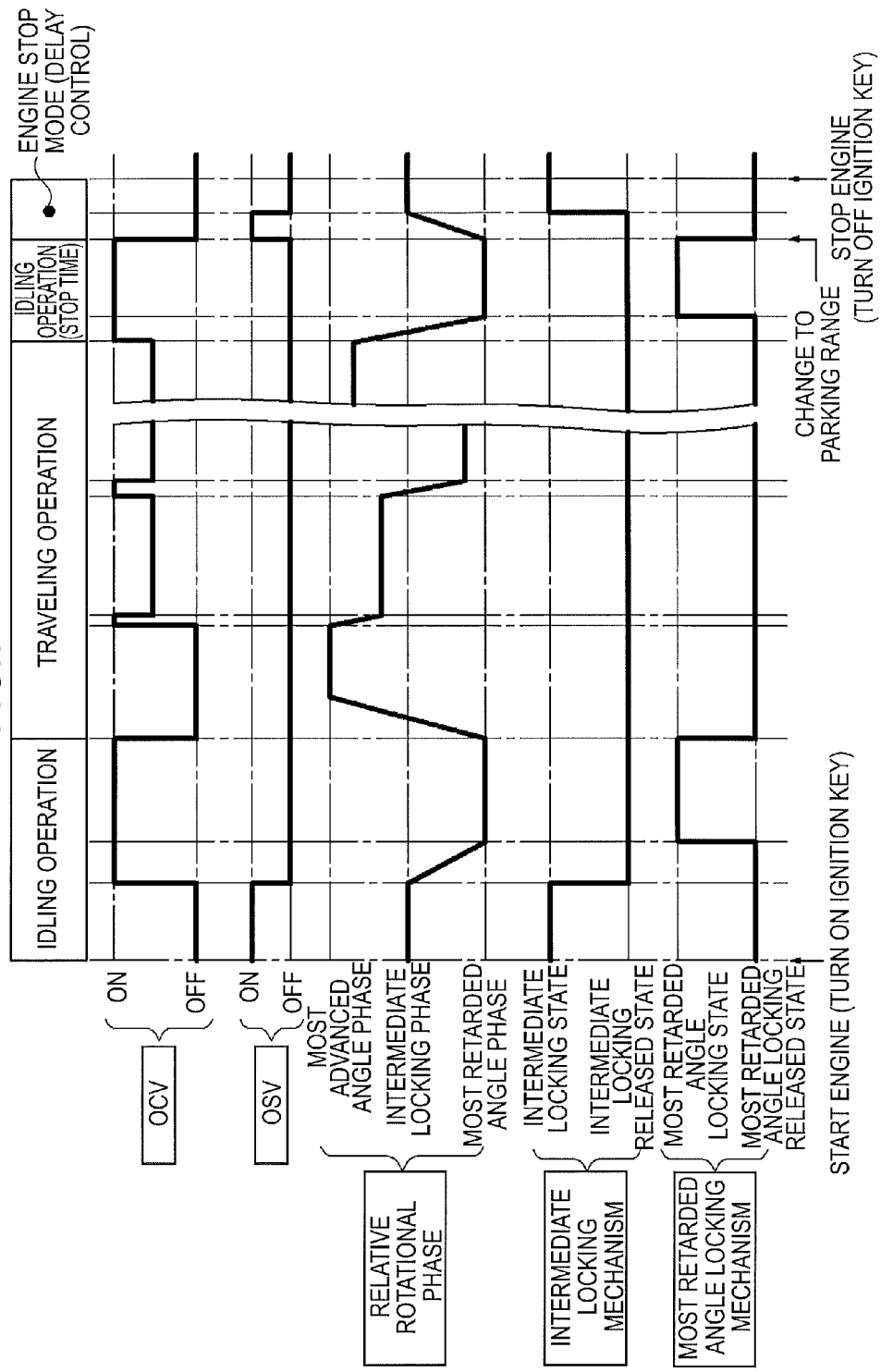
FIG. 7 is a timing chart showing the manner of operation of the valve open/close timing control device.

The manner of operation of the valve open/close timing control device is explained in conjunction with FIG. 2 to FIG. 5. The timing chart of the displacement of the relative rotational phase, the state of the intermediate locking mechanism 6, the state of the most retarded angle locking mechanism 7, the control of the OCV 9 and the control of the OSV 10 from the start to the stop of the engine 100 is shown in FIG. 7.

Before the start of the engine 100, the relative rotational phase is in the intermediate locking state by the intermediate locking mechanism 6. When the ignition key not shown in the drawing is turned on, the engine 100 is started in the state where the relative rotational phase is restrained to the intermediate locking phase (intermediate locking state) as shown in FIG. 2, and the idling operation (before catalyst warming-up) is started. Electricity is supplied to the OSV 10 simultaneously with the turning on of the ignition key and hence, the intermediate locking state is maintained.

When the catalyst warming-up is finished, for changing the relative rotational phase to the most retarded angle phase suitable for idling operation, the retarded angle control is performed by supplying electricity to the OCV 9, and working oil is supplied to the intermediate locking groove 62 by stopping the supply of electricity to the OSV 10. Accordingly, as shown in FIG. 3, the intermediate locking members 64 are retracted from the intermediate locking groove 62 so that the intermediate locking released state is established. Due to such a retarded angle control, working oil in the most retarded angle locking groove 72 is discharged. Thereafter, as shown in FIG. 7, the supply of electricity to the OSV 10 is continuously stopped so that the intermediate locking released state is maintained.

When the relative rotational phase is displaced to the most retarded angle phase suitable for the idling operation as shown in FIG. 4 so that the most retarded angle locking member 74 faces the most retarded angle locking groove 72, the most retarded angle locking member 74 projects into the most retarded angle locking groove 72 as shown in FIG. 4 and hence, the most retarded angle locking state is established. As a result, the inner rotor 2 does not flutter and hence, the stable idling operation state can be acquired.

Figure 5:
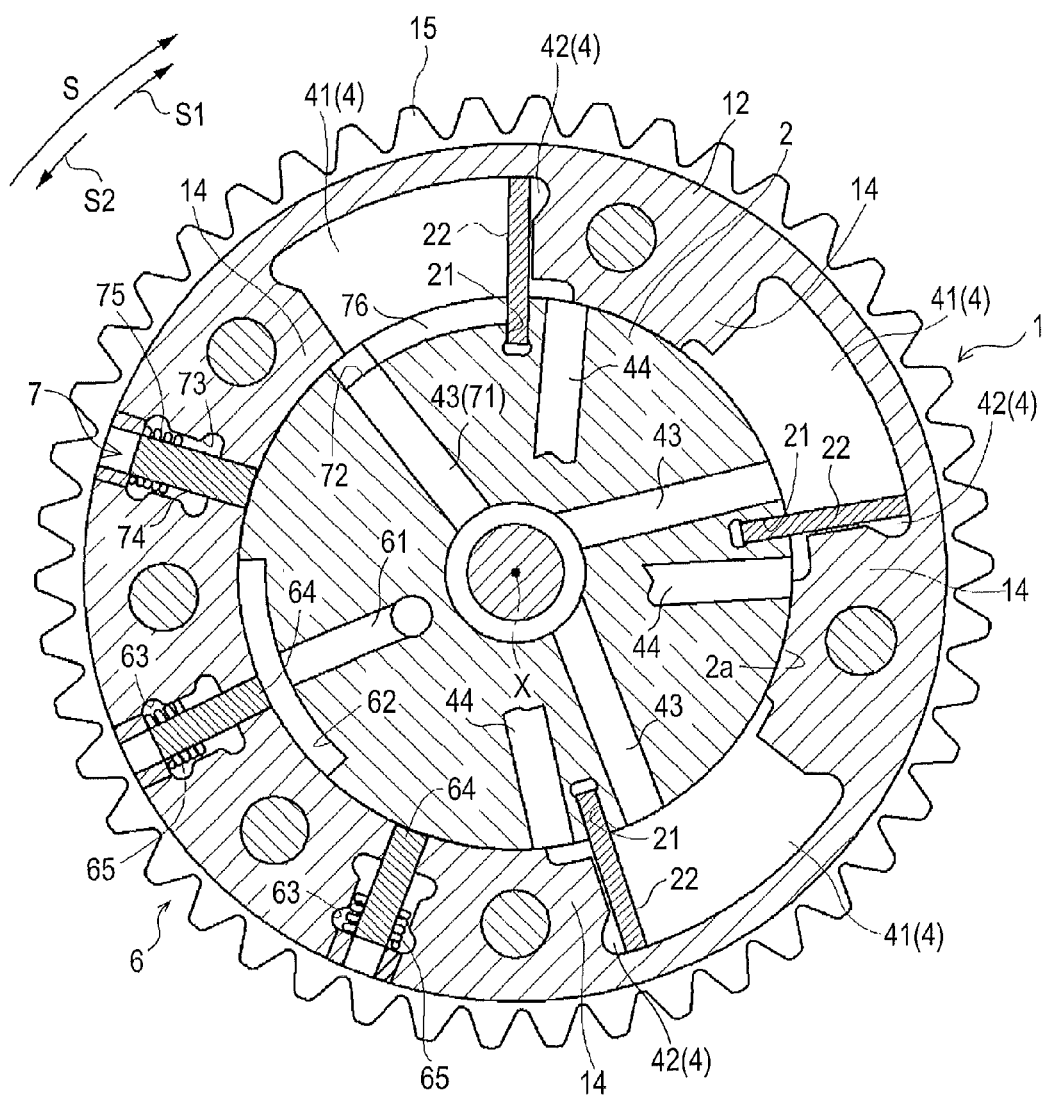
FIG. 5 is a cross-sectional view of the valve open/close timing control device when a relative rotational phase is at a phase on a more advanced angle side than a locking phase.

Thereafter, when the operation of the engine 100 becomes the normal traveling operation state, the retarded angle control is performed corresponding to a load, a rotational speed or the like of the engine 100 so that the relative rotational phase is displaced to the phase on a more retarded angle side than the locking phase or, as shown in FIG. 5, the advanced angle control is performed so that the relative rotational phase is displaced to the phase on the more advanced angle side than the locking phase, or electricity is supplied with an adjusted duty ratio so that the relative rotational phase is held at the arbitrary phase. Although the most retarded angle locking state is established each time the relative rotational phase becomes the most retarded angle phase, the most retarded angle locking released state can be readily acquired by performing the advanced angle control and hence, there arises no inconvenience.

Usually, the vehicle stop operation is performed before the engine 100 is stopped so that the idling operation is performed. The relative rotational phase becomes the most retarded angle phase so that the most retarded angle locking state is established. Thereafter, for example, when the shift lever position is changed from the traveling range to the parking range for stopping the engine 100, the ECU 8 brings the engine 100 into the stop mode. That is, the ECU 8 performs the so-called delay control. To be more specific, the ECU 8 does not readily transmit a stop command to the oil pump 5 (engine 100) and, as shown in FIG. 7, when the shift lever position is changed to the parking range, the ECU 8 stops the supply of electricity to the OCV 9 and performs the advanced angle control. Accordingly, the most retarded angle locking released state is established so that the relative rotational phase is displaced to the advanced angle side. That is, the relative rotational phase is changed to the intermediate locking phase. The ECU 8 starts the supply of electricity to the OSV 10 so that working oil in the intermediate locking groove 62 is discharged. Accordingly, when the relative rotational phase becomes the intermediate locking phase, both intermediate locking members 64 project into the intermediate locking groove 62 so that the intermediate locking state is established. When the ignition key is turned off after the relative rotational phase becomes the intermediate locking state, the oil pump 5 (engine 100) is readily stopped.

In this embodiment, the vehicle stop operation is performed before the engine 100 is stopped and, when the idling operation is performed, the relative rotational phase becomes the most retarded angle phase so that the most retarded angle locking state is established. Therefore, when the shift lever position is changed to the parking range thereafter, the relative rotational phase is surely changed to the intermediate locking phase from the most retarded phase. Accordingly, the relative rotational phase is smoothly changed to the intermediate locking phase from the retarded angle side without causing the fluttering of the inner rotor 2.

When the engine stop or the like occurs, there may be a case where the engine 100 is stopped in the intermediate locking released state. However, when the engine 100 is restarted and the ECU 8 determines that the relative rotational phase is not at the intermediate locking state, the ECU 8 performs the advanced angle control or the retarded angle control such that the relative rotational phase becomes the intermediate locking phase thus surely generating the intermediate locking state. In this manner, after the engine 100 is stopped, the engine 100 can be always started in a state where the relative rotational phase is restrained to the intermediate locking phase and hence, it is possible to provide the low-emission engine. However, as described previously, the engine 100 according to this embodiment can be started even when the relative rotational phase is at the most retarded angle phase and hence, such a constitution which does not perform the control for an abnormal stop does not cause any serious problem.

In this embodiment, the example where the retarded angle control becomes possible with the supply of electricity to the OCV 9 and the advanced angle control becomes possible with the stop of the supply of electricity has been explained. However, the OCV 9 is not limited to such an example. The OCV 9 may be configured such that the advanced angle control becomes possible with the supply of electricity to the OCV 9 and the retarded angle control becomes possible with the stop of the supply of electricity.

In the same manner, in this embodiment, the example where working oil can be discharged from the intermediate locking groove 62 with the supply of electricity to the OSV 10 and working oil can be supplied to the intermediate locking groove 62 with the stop of the supply of electricity has been explained. However, this disclosure is not limited to such an example. The OSV 10 may be configured such that working oil can be supplied to the intermediate locking groove 62 with the supply of electricity to the OSV 10 and working oil can be discharged from the intermediate locking groove 62 with the stop of the supply of electricity.

[First Another Embodiment]

In the above-mentioned embodiment, the example where the intermediate locking mechanism 6 includes the locking groove 62 and the locking members 64 and the most retarded angle locking mechanism 7 includes the locking groove 72 and the locking member 74 has been explained. However, a locking member may be used in common by the intermediate locking mechanism 6 and the most retarded angle locking mechanism 7. That is, the intermediate locking mechanism 6 and the most retarded angle locking mechanism 7 may include the locking grooves formed in the inner rotor 2 respectively, and also include the common locking member which is arranged on the outer rotor 12 in such a manner that the common locking member is extendable into and retractable from the respective locking grooves and are engaged with the locking grooves when the common locking member projects into the locking groove so as to restrain the rotational movement of the inner rotor 2 relative to the housing 1 to the intermediate locking phase or the most retarded angle phase. This another embodiment is explained in conjunction with FIG. 8 to FIG. 11. The explanation of the constitutions of this another embodiment substantially equal to the constitutions of the above-mentioned embodiment is omitted. Further, constitutional parts of this embodiment identical to the corresponding constitutional parts of the above-mentioned embodiment are given same symbols.

Figure 8:
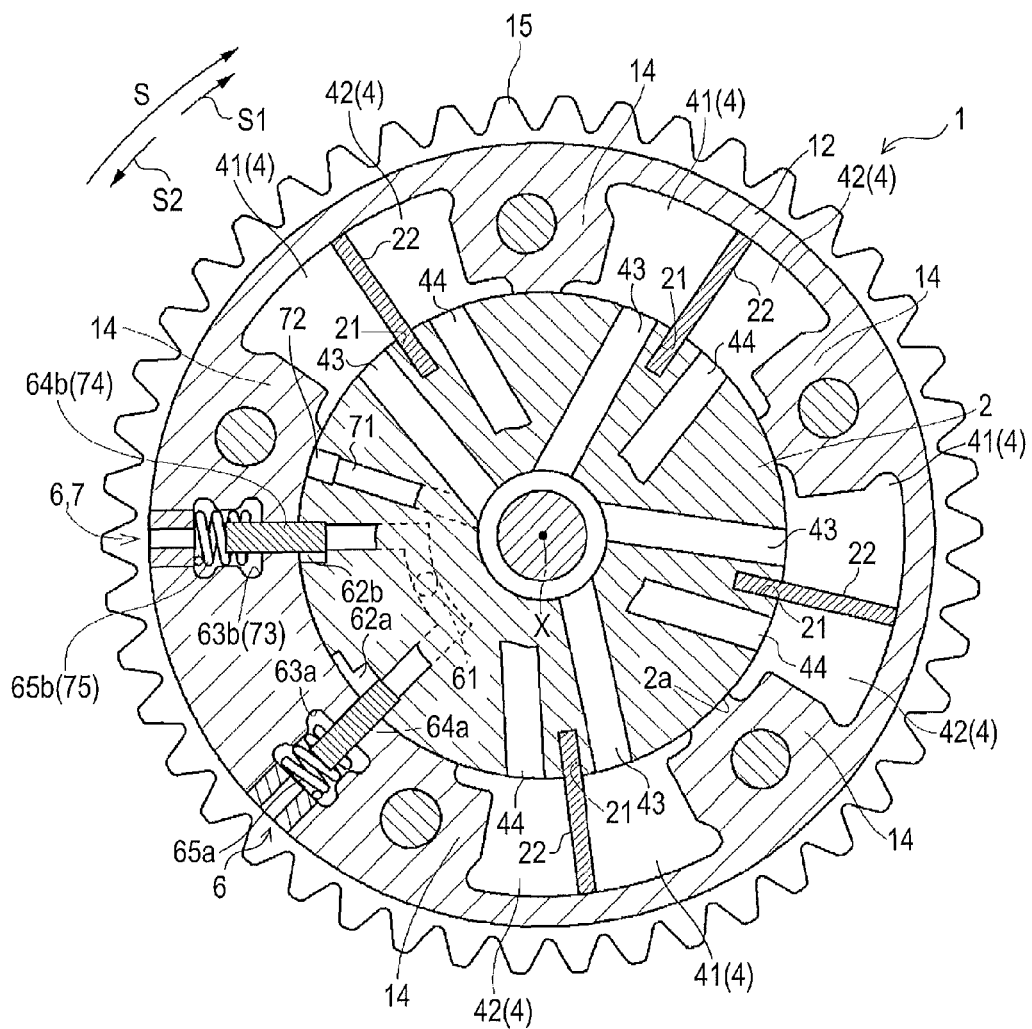
FIG. 8 is a cross-sectional view of the valve open/close timing control device of first another embodiment in an intermediate locking state.

The intermediate locking mechanism 6 includes, as shown in FIG. 8, the intermediate lock passage 61, two intermediate locking grooves 62a, 62b, accommodating portions 63a, 63b, plate-shaped intermediate locking members 64a, 64b and springs 65a, 65b. Out of the two intermediate locking grooves 62a, 62b, the intermediate locking groove 62a on a retarded angle direction S2 side (groove which restricts the displacement of the relative rotational phase in the advanced angle direction S1) constitutes a ratchet mechanism where a depth of the intermediate locking groove 62a is radially increased in the stepwise manner along the retarded angle direction S2. Accordingly, the intermediate locking member 64a is restricted in the stepwise manner and hence, the intermediate locking member 64a can easily project into the intermediate locking groove 62a. The intermediate lock passage 61 is branched in a bifurcated manner in the midst of the inner rotor 2, and the branched passages are connected to the intermediate locking grooves 62a, 62b respectively.

The most retarded angle locking mechanism 7 includes, as shown in FIG. 8, the most retarded angle lock passage 71, the most retarded angle locking groove 72, the accommodating portion 73, the plate-shaped most retarded angle locking member 74 and the spring 75. Different from the above-mentioned embodiment, the most retarded angle lock passage 71 is formed by being branched from the advanced angle passage 43. The most retarded angle locking member 74 is the same member as the intermediate locking member 64b on an advanced angle direction S1 side (member which restricts the displacement of the relative rotational phase in the retarded angle direction S2) out of the two intermediate locking members 64a, 64b. In the same manner, the accommodating portion 73 is the same member as the accommodating portion 63b on an advanced angle direction S1 side out of the two accommodating portions 63a, 63b, and the spring 75 is equal to the spring 65b arranged in the housing portion 63b.

Figure 9:
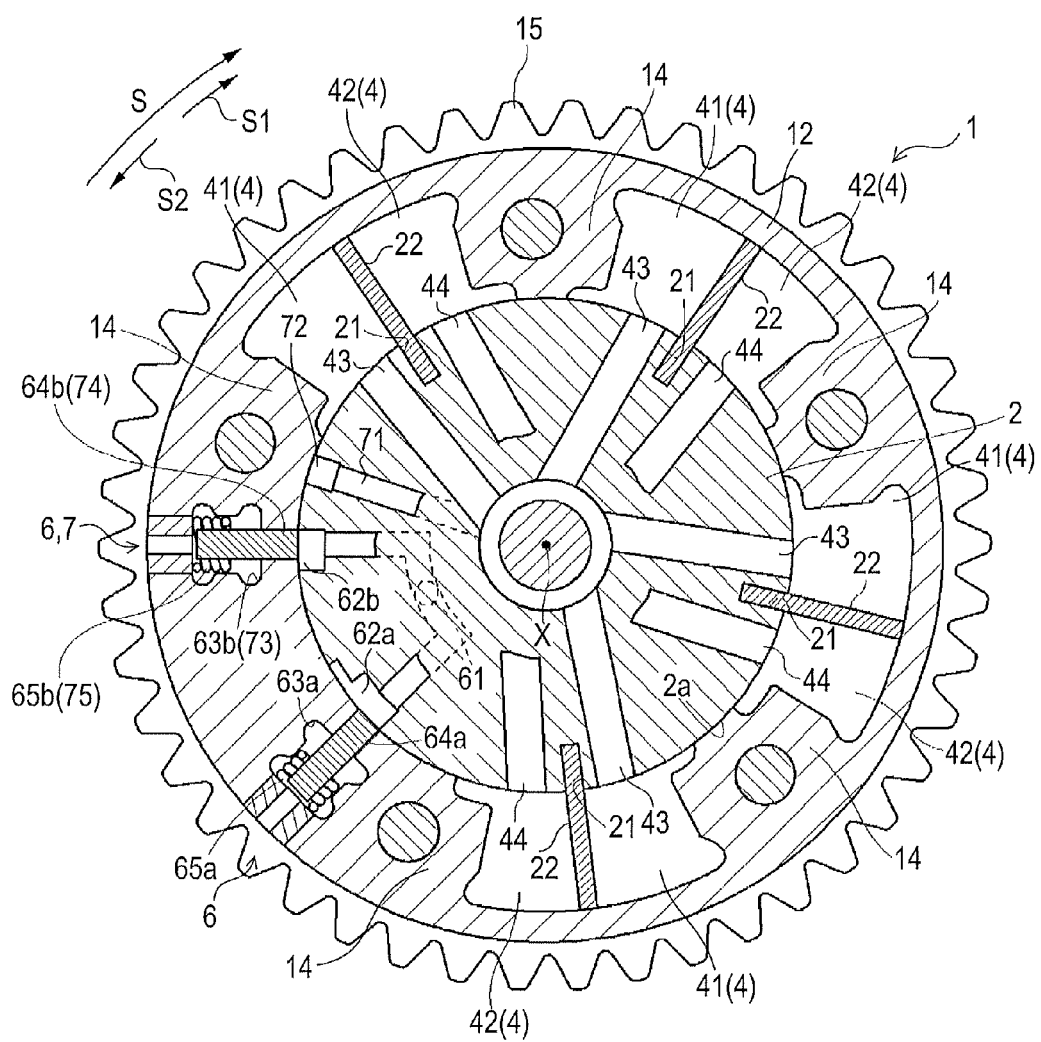
FIG. 9 is a cross-sectional view of the valve open/close timing control device when the intermediate locking state shown in FIG. 8 is released.

With these constitutions, in the same manner as the above-mentioned embodiment, a control such as the control shown in FIG. 7 is performed. When the supply of electricity to the OSV 10 is stopped in the intermediate locking state shown in FIG. 8, an intermediate locking released state is established as shown in FIG. 9. Thereafter, so long as the stop of supply of electricity to the OSV 10 is continued, working oil is continuously supplied to the intermediate locking groove 62 and hence, there is no possibility that the intermediate locking members 64 project into the intermediate locking grooves 62.

Figure 10:
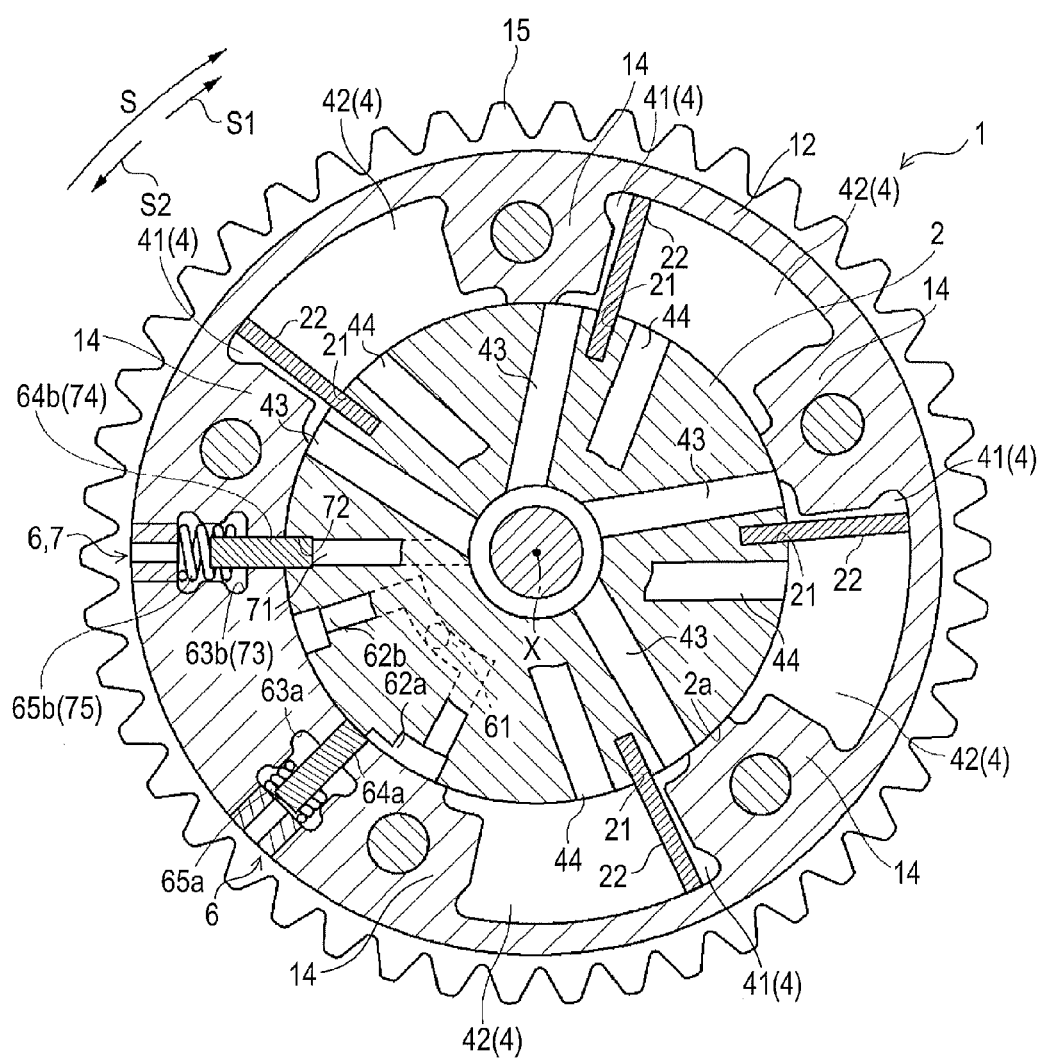
FIG. 10 is a cross-sectional view of the valve open/close timing control device of the first another embodiment when a relative rotational phase is at a most retarded angle phase.

As shown in FIG. 10, when the relative rotational phase is displaced to the most retarded angle phase so that the most retarded angle locking member 74 faces the most retarded angle locking groove 72 in an opposed manner, the most retarded angle locking member 74(64*b*) projects into the most retarded angle locking groove 72 whereby a most retarded angle locking state is established.

Figure 11:
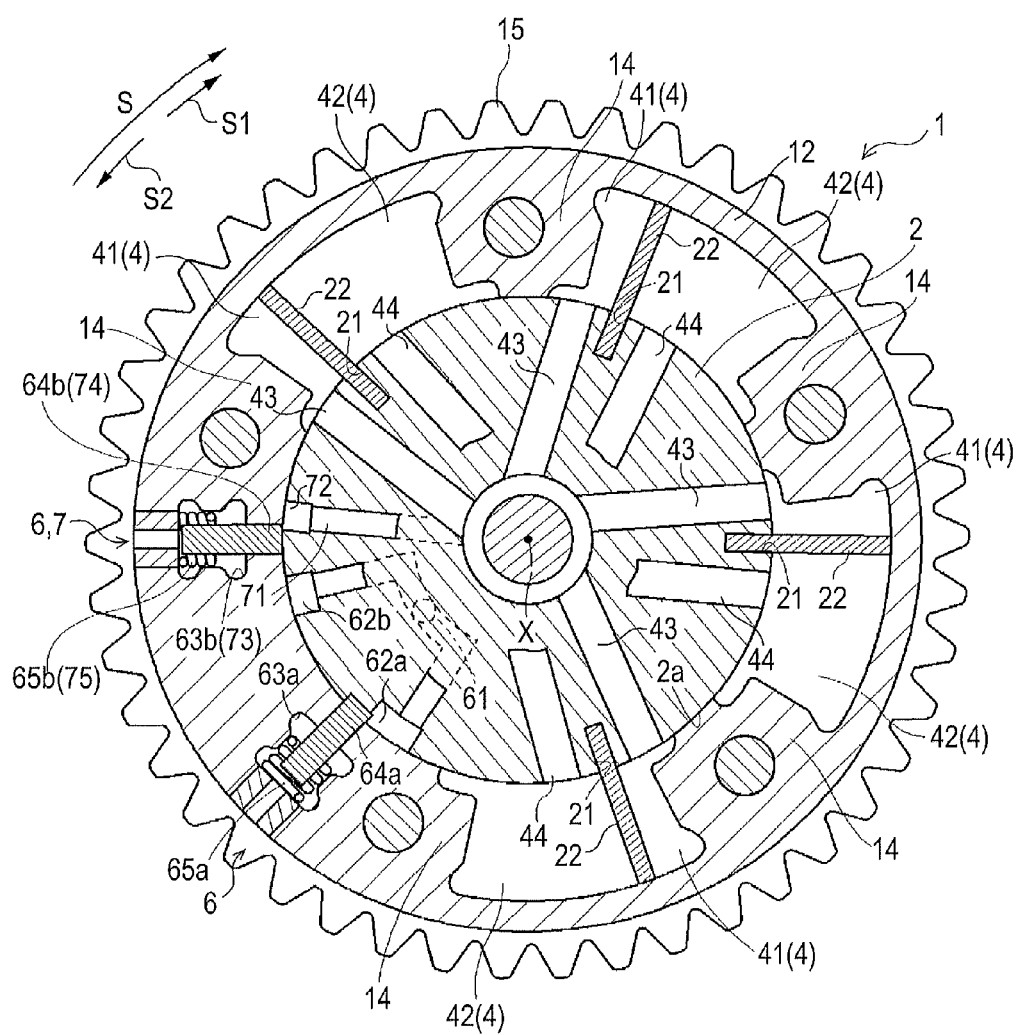
FIG. 11 is a cross-sectional view of the valve open/close timing control device of the first another embodiment immediately before a relative rotational phase becomes an intermediate locking state.

In this embodiment, the intermediate locking mechanism 6 adopts the ratchet mechanism and hence, the engine may be configured to be stopped when the shift lever position is changed from a traveling range to a parking range, for example, and the engagement of at least a portion of the intermediate locking members 64*a*, 64*b* with the intermediate locking grooves 62*a*, 62*b* shown in FIG. 11 is detected. The engagement of at least the portion of the intermediate locking members 64*a*, 64*b* with the intermediate locking grooves 62*a*, 62*b* can be detected based on the displacement of the intermediate locking members 64*a*, 64*b* in the radial direction or a phase change amount of the relative rotational phase.

Usually, a locking state where the relative rotational phase becomes the intermediate lock phase is established after the ignition key is turned off and, thereafter, the engine 100 is stopped. To the contrary, according to the constitution of this disclosure, the engine 100 is stopped in response to the detection of the engagement of at least a portion of the intermediate locking members 64*a*, 64*b* with the intermediate locking grooves 62*a*, 62*b* in the intermediate locking mechanism 6 due to the operation of changing the shift lever position to the parking range. Accordingly, the engine 100 can be stopped at an early stage of the engagement of the intermediate locking members 64*a*, 64*b* with the intermediate locking grooves 62*a*, 62*b* so that timing that the engine 100 is stopped can be advanced. As a result, the further enhancement of fuel economy can be realized.

However, as in the case of the above-mentioned constitution, since the engine 100 is stopped at an early stage of the engagement of the intermediate locking members 64*a*, 64*b* with the intermediate locking grooves 62*a*, 62*b* in the intermediate locking mechanism 6, there is a possibility that the engagement between the intermediate locking members 64*a*, 64*b* and the intermediate locking grooves 62*a*, 62*b* becomes insufficient at the time of stopping the engine 100. Even in such a case, however, when the engine 100 is started by turning on the ignition key, the ratchet mechanism functions so that the intermediate locking members 64*a*, 64*b* are surely engaged with the intermediate locking grooves 62*a*, 62*b*. Accordingly, the relative rotational phase is held at the intermediate lock phase at the time of starting the engine 100 and hence, the engine 100 can be started in a state where the relative rotational phase is in the intermediate lock phase.

Further, with the use of the constitution of this embodiment, the constitution can be simplified and the number of parts can be reduced whereby a manufacturing cost can be reduced. Further, the intermediate locking member 64*b* and the most retarded angle locking member 74 can be used in common and hence, a space is affordable in the outer rotor 12 in the circumferential direction whereby the fluid pressure chamber 4 can be provided at four places as shown in FIG. 8. As a result, a force which displaces the relative rotational phase is increased thus realizing the speedy phase displacement. It is also possible to widen a range where the relative rotational phase can be displaced by widening a width of the fluid pressure chamber 4 in the circumferential direction.

[Second Another Embodiment]

Figure 12:
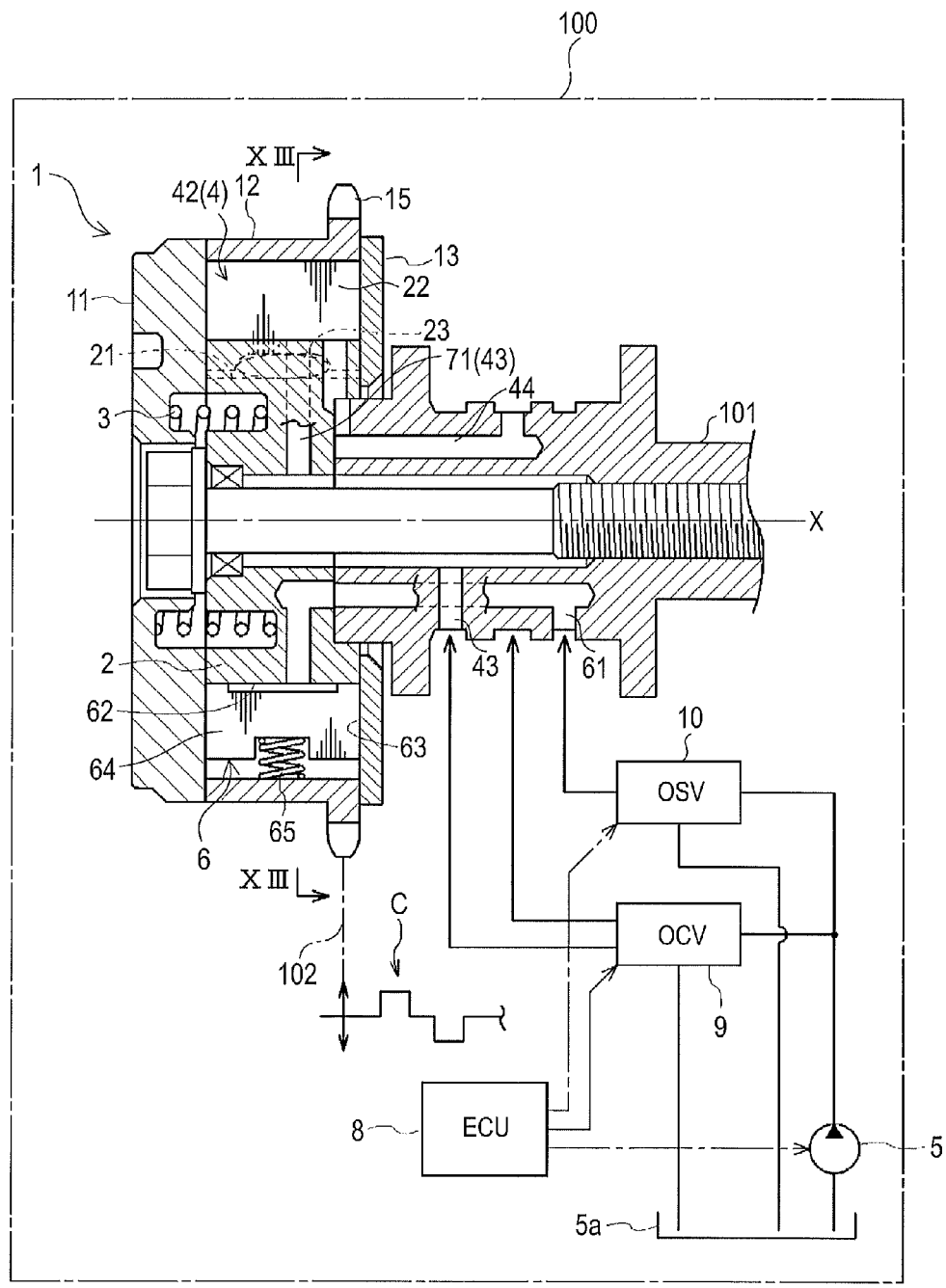
FIG. 12 is a view showing the overall constitution of a valve open/close timing control device according to second another embodiment.

In the above-mentioned embodiment, the intermediate locking mechanism 6 is controlled by the OSV 10, and the most retarded angle locking mechanism 7 is controlled by the OCV 9. However, this disclosure is not limited to such a control. Both the intermediate locking mechanism 6 and the most retarded angle locking mechanism 7 may be controlled using only one OSV 10. This another embodiment is explained in conjunction with FIG. 12 to FIG. 14. The explanation of the constitutions of this another embodiment substantially equal to the constitutions of the above-mentioned embodiment is omitted. Further, constitutional parts of this embodiment identical to the corresponding constitutional parts of the above-mentioned embodiment are given same symbols. As shown in FIG. 12, the arrangement structure of the housing 1, the inner rotor 2, the oil pump 5, the OCV 9, the OSV 10 and the like is equal to the corresponding arrangement structure of the above-mentioned embodiment.

Figure 13:
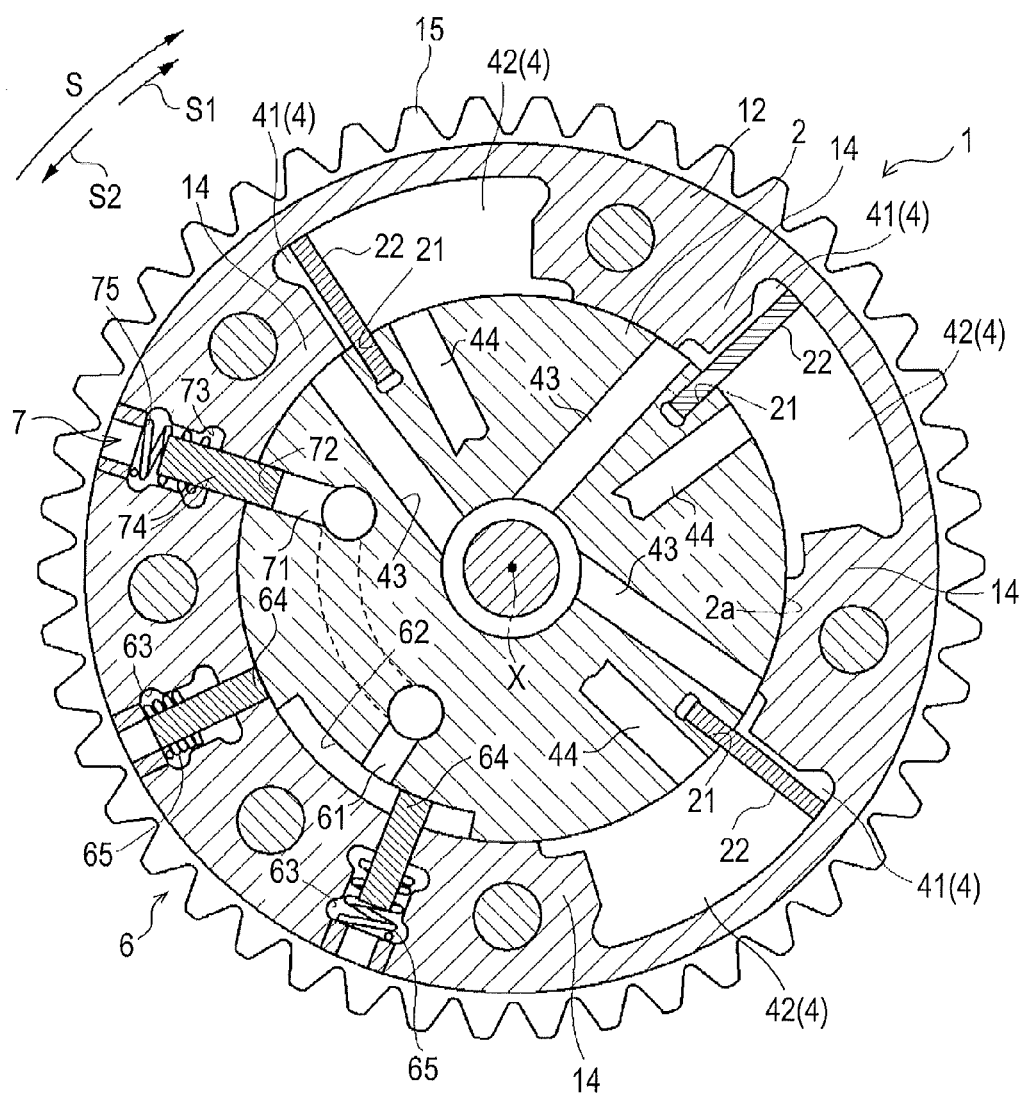
FIG. 13 is a cross-sectional view taken along a line XIII-XIII in FIG. 12, and also is a cross-sectional view of the valve open/close timing control device in a most retarded angle locking state.

As shown in FIG. 13, the intermediate lock passage 61 is bifurcated on the inner rotor 2 side, and one branched passage is connected to the intermediate locking groove 62 and the other branched passage is connected to the most retarded angle locking groove 72. That is, the intermediate lock passage 61 also functions as the most retarded angle lock passage 71. Accordingly, when working oil is supplied to the intermediate lock passage 61 by controlling the OSV 10, working oil is supplied to both the intermediate locking groove 62 and the most retarded angle locking groove 72. Further, by controlling the OSV 10 such that working oil is discharged from the intermediate locking groove 62, working oil is also discharged from the most retarded angle locking groove 72.

The manner of operation of the valve open/close timing control device is explained. The timing chart of the displacement of the relative rotational phase, the state of the intermediate locking mechanism 6, the state of the most retarded angle locking mechanism 7, a control of the OCV 9 and a control of the OSV 10 from the start to the stop of the engine 100 is shown in FIG. 14. The manner of operation of the valve open/close timing control device is explained in conjunction with the timing chart shown in FIG. 14. The state of the intermediate locking mechanism 6 and the state of the most retarded angle locking mechanism 7 at each phase are equal to the state of the intermediate locking mechanism 6 and the state of the most retarded angle locking mechanism 7 at each phase in the above-mentioned embodiment and hence, cross-sectional views corresponding to those shown in FIG. 2 to FIG. 5 are not provided.

Before the start of the engine 100, the intermediate locking state is established by the intermediate locking mechanism 6. When an ignition key not shown in the drawing is turned on, the engine 100 is started in the state where the relative rotational phase is restrained to an intermediate locking phase (intermediate locking state), and the idling operation (before catalyst warming-up) is started. When the ignition key is turned on, electricity is supplied to the OSV 10 simultaneously and hence, the intermediate locking state is maintained.

When the catalyst warming-up is finished, for changing the relative rotational phase to the most retarded angle phase suitable for idling operation, the retarded angle control is performed by supplying electricity to the OCV 9 and the supply of electricity to the OSV 10 is stopped so that working oil is supplied to the intermediate locking groove 62 and the most retarded angle locking groove 72. Accordingly, both intermediate locking members 64 are retracted from the intermediate locking groove 62 so that the intermediate locking released state is established. When the displacement of the relative rotational phase toward a retarded angle side is started, the supply of electricity to the OSV 10 is started. Accordingly, working oil is discharged from the intermediate locking groove 62 and the most retarded angle locking groove 72. Here, there is a possibility that one of the two intermediate locking members 64 project into the intermediate locking groove 62 again. However, there is no possibility that both intermediate locking members 64 project into the intermediate locking groove 62 and hence, the intermediate locking released state is kept unchanged. Further, by setting a control of the valve open/close timing control device such that the supply of electricity to the OSV 10 is stopped when an advanced angle control is performed, one intermediate locking member 64 which projects into the intermediate locking groove 62 is immediately retracted from the intermediate locking groove 62.

When the relative rotational phase is displaced to the most retarded angle phase suitable for the idling operation so that the most retarded angle locking member 74 faces the most retarded angle locking groove 72 in an opposed manner, as shown in FIG. 13, the most retarded angle locking member 74 projects into the most retarded angle locking groove 72 and hence, the most retarded angle locking state is established. As a result, the inner rotor 2 does not flutter and hence, the stable idling operation state can be acquired.

Thereafter, when the advanced angle control for changing the operation state to the usual traveling state is performed, the supply of electricity to the OSV 10 is stopped and hence, the most retarded angle locking state is released. Thereafter, so long as the usual traveling operation continues, the supply of electricity to the OSV 10 is continuously stopped so that the intermediate locking released state and the most retarded angle locking state are maintained.

When the vehicle stop operation before the engine 100 is stopped is performed, the relative rotational phase becomes the most retarded angle phase so that the supply of electricity to the OSV 10 is started and the most retarded angle locking state is established. Thereafter, for example, when the shift lever position is changed from the traveling range to the parking range for stopping the engine 100, the ECU 8 brings the engine 100 into the stop mode. That is, the ECU 8 performs the so-called delay control. To be more specific, the ECU 8 does not readily transmit a stop command to the oil pump 5 (engine 100) and, as shown in FIG. 14, when the shift lever position is changed to the parking range, the ECU 8 transmits a command so as to stop the supply of electricity to the OCV 9 thus performing the advanced angle control and to stop the supply of electricity to the OSV 10. Accordingly, the most retarded angle locking released state is established so that the relative rotational phase is displaced to the advanced angle side. That is, the relative rotational phase is changed to the intermediate locking phase. When the displacement of the relative rotational phase to the advanced angle side starts, the ECU 8 starts the supply of electricity to the OSV 10 and hence, working oil in the intermediate locking groove 62 is discharged. Accordingly, when the relative rotational phase becomes the intermediate locking phase, both intermediate locking members 64 project into the intermediate locking groove 62 so that the intermediate locking state is established. When the ignition key is turned off after the relative rotational phase assumes the intermediate locking phase, the oil pump 5 (engine 100) is readily stopped.

In this embodiment, even when the second predetermined phase is not at the most retarded angle phase, the relative rotational phase can be restrained to the phase different from the intermediate locking phase. Accordingly, the second predetermined phase can be set over a wide range corresponding to demanded advantageous effects.

In this embodiment, the example where the retarded angle control becomes possible with the supply of electricity to the OCV 9 and the advanced angle control becomes possible with the stop of the supply of electricity has been explained. However, the OCV 9 is not limited to such an example. For example, the OCV 9 may be configured such that the advanced angle control becomes possible with the supply of electricity to the OCV 9 and the retarded angle control becomes possible with the stop of the supply of electricity.

In the same manner, in this embodiment, the example where working oil can be discharged from the intermediate locking groove 62 with the supply of electricity to the OSV 10 and working oil can be supplied to the intermediate locking groove 62 with the stop of the supply of electricity has been explained. However, this disclosure is not limited to such an example. The OSV 10 may be configured such that working oil can be supplied to the intermediate locking groove 62 with the supply of electricity to the OSV 10 and working oil can be discharged from the intermediate locking groove 62 with the stop of the supply of electricity.

[Another Embodiment]

(1) In the above-mentioned embodiment, the valve open/close timing control device includes the torsion spring 3 which biases the inner rotor 2 toward the advanced angle side. However, this disclosure is not limited to such a constitution. For example, the valve open/close timing control device may include a torsion spring which biases the inner rotor 2 toward a retarded angle side. Due to such a constitution, a time during which the most retarded angle locking member 74 faces the most retarded angle locking groove 72 in an opposed manner is prolonged or the number of timings that the most retarded angle locking member 74 faces the most retarded angle locking groove 72 in an opposed manner is increased so that the most retarded angle locking member 74 can more easily project into the most retarded angle locking groove 72. Further, although not shown in the drawing, the valve open/close timing control device may not include the torsion spring per se.

(2) In the above-mentioned embodiment, in both the intermediate locking mechanism 6 and the most retarded angle locking mechanism 7, the locking member is formed on the housing 1 such that the locking member extends or retracts in the radial direction, and the locking grooves are formed in the inner rotor 2. However, this disclosure is not limited to such a constitution. For example, although not shown in the drawing, a locking member may be formed on the front plate 11 or the rear plate 13 and may extend or retract in the direction of the rotation axis X. Further, with respect to one locking mechanism or both locking mechanisms, a locking member may be formed on the inner rotor 2, and a locking groove may be formed on a member on a housing 1 side. In these cases, however, it is necessary to form a lock passage on a housing 1 side or it is necessary to provide another OSV besides the OSV 10.

(3) In the above-mentioned first another embodiment (FIG. 8 to FIG. 11), the explanation has been made with respect to the example where the ratchet mechanism is formed by deepening only one intermediate locking groove 62a out of the intermediate locking grooves 62a, 62b of the intermediate locking mechanism 6 in a stepwise manner. However, the other intermediate locking groove 62b may be deepened in a stepwise manner in the same manner as one intermediate locking groove 62a thus forming both intermediate locking grooves 62a, 62b into a ratchet mechanism. Further, the intermediate locking mechanism 6 may include one intermediate locking groove and one intermediate locking member.

(4) In a hybrid vehicle, by setting an intermediate locking phase at a decompression phase where the intake valve can be closed with a delay, it is also possible to restrain the relative rotational phase to the decompression phase at the time of starting the internal combustion engine by the intermediate locking mechanism 6. As a result, an impact (transfer shock) which is generated at the time of switching an operation from a traveling operation by the motor to a traveling operation by the internal combustion engine can be surely reduced, and the generation of a striking sound at the time of starting the internal combustion engine can be also prevented.

This disclosure is applicable not only to the valve open/close timing control device on an intake valve side but also to the valve open/close timing control device on an exhaust side. Further, this disclosure is applicable to a valve open/close timing control device of an internal combustion engine of an automobile or the like.

Therefore, aspects of this disclosure are further described below.

According to an aspect of this disclosure, there is provided a valve open/close timing control device including:

a drive-side rotating body which is rotatable synchronously with a crankshaft of an internal combustion engine;

a driven-side rotating body which is arranged coaxially with the drive-side rotating body and in a rotatable manner relative to the drive-side rotating body, and is integrally rotatable with a camshaft for opening or closing a valve of the internal combustion engine;

a fluid pressure chamber which is formed on either one of the drive-side rotating body and the driven-side rotating body;

a partition portion mounted on the other of the drive-side rotating body and the driven-side rotating body so as to partition the fluid pressure chamber into an advanced angle chamber and a retarded angle chamber;

a fluid control valve part which controls the supply and the discharge of a fluid to and from the advanced angle chamber or the retarded angle chamber;

a first locking mechanism which is capable of restraining a relative rotational phase of the driven-side rotating body relative to the drive-side rotating body to a first predetermined phase between a most retarded angle phase and a most advanced angle phase; and a second locking mechanism which is capable of restraining the relative rotational phase at a second predetermined phase on a more retarded angle side than the first predetermined phase, in which the relative rotational phase is changed to the first predetermined phase when a shift lever position is changed to a parking range.

According to the above-mentioned constitution, the relative rotational phase can be restrained to the different valve timing phases such as the first predetermined phase and the second predetermined phase by the first locking mechanism and the second locking mechanism. Accordingly, the engine can be started at an optimum predetermined phase corresponding to a state of the internal combustion engine thus enhancing comfortability of driving.

Further, when the shift lever position is changed to the parking range, usually, an ignition key is turned off thereafter so that the engine is stopped. In view of the above, in this constitution, the valve open/close timing control device is configured such that the operation of changing the relative rotational phase to the first predetermined phase is started at the time of changing the shift lever position to the parking range before the turn-off operation of the ignition key. Accordingly, a delay control is started at an early stage before the turn-off operation of the ignition key so that undesired fuel consumption can be suppressed. As a result, the fuel economy can be enhanced. Further, since the delay control is completed before the turn-off operation of the ignition key so that the internal combustion engine is readily stopped when the ignition key is turned off. Accordingly, a driver feels no discomfort in an operation of stopping the internal combustion engine after turning off the ignition key.

According to another aspect of this disclosure, the first locking mechanism is constituted of a ratchet mechanism which includes a locking groove which is deepened in a stepwise manner and a locking member which is engageable with the locking groove, and the internal combustion engine is stopped in response to the detection of the engagement of at least a portion of the locking member with the locking groove due to the operation of changing the shift lever position to the parking range.

Usually, a locking state where the relative rotational phase becomes the first predetermined phase is established after the ignition key is turned off and, thereafter, the internal combustion engine is stopped. To the contrary, according to the above-mentioned constitution, the internal combustion engine is stopped in response to the detection of the engagement of at least a portion of the locking member with the locking groove in the first locking mechanism due to the operation of changing the shift lever position to the parking range. Accordingly, the internal combustion engine can be stopped at an early stage of the engagement of the locking member with the locking groove so that timing that the internal combustion engine is stopped can be advanced. As a result, the further enhancement of fuel economy can be realized.

According to this constitution, since the internal combustion engine is stopped at an early stage of the engagement of the locking member with the locking groove in the first locking mechanism, there is a possibility that the engagement between the locking member and the locking groove becomes insufficient at the time of stopping the internal combustion engine. Even in such a case, however, when the internal combustion engine is started by turning on the ignition key, the ratchet mechanism functions so that the locking member is surely engaged with the locking groove. Accordingly, the relative rotational phase is held at the first predetermined phase at the time of starting the internal combustion engine and hence, the internal combustion engine can be started in a state where the relative rotational phase is in a first predetermined phase.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changed may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A valve open/close timing control device comprising:
a drive-side rotating body which is rotatable synchronously with a crankshaft of an internal combustion engine;
a driven-side rotating body which is arranged coaxially with the drive-side rotating body and in a rotatable manner relative to the drive-side rotating body, and is integrally rotatable with a camshaft for opening or closing a valve of the internal combustion engine;
a fluid pressure chamber which is formed on either one of the drive-side rotating body and the driven-side rotating body;
a partition portion mounted on the other of the drive-side rotating body and the driven-side rotating body so as to partition the fluid pressure chamber into an advanced angle chamber and a retarded angle chamber;

a fluid control valve part which controls the supply and the discharge of a fluid to and from the advanced angle chamber or the retarded angle chamber;

a first locking mechanism which restrains a relative rotational phase of the driven-side rotating body relative to the drive-side rotating body at a first predetermined phase between a most retarded angle phase and a most advanced angle phase; and a second locking mechanism which restrains the relative rotational phase at a second predetermined phase on a more retarded angle side than the first predetermined phase, wherein the relative rotational phase is changed to the first predetermined phase when a shift lever position is changed to a parking range.

2. The valve open/close timing control device according to claim 1, wherein the first locking mechanism is constituted of a ratchet mechanism which includes a locking groove which is deepened in a stepwise manner and a locking member which is engageable with the locking groove, and the internal combustion engine is stopped in response to the detection of the engagement of at least a portion of the locking member with the locking groove due to an operation of changing the shift lever position to the parking range.

3. The valve open/close timing control device according to claim 1, wherein the first locking mechanism includes two spaced apart locking members.

4. The valve open/close timing control device according to claim 3, wherein the second locking mechanism includes a further locking member spaced apart from the two locking members constituting the first locking mechanism.

5. The valve open/close timing control device according to claim 1, wherein the first locking mechanism includes two spaced apart intermediate locking members and a common locking groove in which the two spaced apart intermediate locking members are positioned to restrain the relative rotational phase of the driven-side rotating body relative to the drive-side rotating body at the first predetermined phase, and the second locking mechanism including a most retarded angle locking member and a most retarded angle lock passage in which the most retarded angle locking member is positioned to restrain the relative rotational phase at the second predetermined phase.

6. The valve open/close timing control device according to claim 1, wherein the first locking mechanism includes first and second spaced apart intermediate locking members, and first and second intermediate locking grooves in which the first and second intermediate locking members respectively are positioned to restrain the relative rotational phase of the driven-side rotating body relative to the drive-side rotating body at the first predetermined phase, the second locking mechanism including the second intermediate locking member and a most retarded angle lock passage in which the second intermediate locking member is positioned to restrain the relative rotational phase at the second predetermined phase.

* * * * *